(12) United States Patent
Nakano et al.

(10) Patent No.: US 10,793,353 B2
(45) Date of Patent: Oct. 6, 2020

(54) ARTICLE TRANSPORTATION SYSTEM, TRANSPORTATION DEVICE, AND ARTICLE TRANSPORTATION METHOD

(71) Applicant: Hitachi Industrial Products, Ltd., Chiyoda-ku, Tokyo (JP)

(72) Inventors: Koichi Nakano, Tokyo (JP); Yoriko Kazama, Tokyo (JP); Junichi Kimura, Tokyo (JP); Hiroshi Yoshitake, Tokyo (JP)

(73) Assignee: Hitachi Industrial Products, Ltd., Tokyo (JP)

( * ) Notice: Subject to any disclaimer, the term of this patent is extended or adjusted under 35 U.S.C. 154(b) by 0 days.

(21) Appl. No.: 15/762,953

(22) PCT Filed: Jan. 27, 2017

(86) PCT No.: PCT/JP2017/003034
§ 371 (c)(1),
(2) Date: Mar. 23, 2018

(87) PCT Pub. No.: WO2017/138377
PCT Pub. Date: Aug. 17, 2017

(65) Prior Publication Data
US 2018/0265297 A1    Sep. 20, 2018

(30) Foreign Application Priority Data

Feb. 12, 2016    (JP) .................................. 2016-024780

(51) Int. Cl.
*B65G 1/04*    (2006.01)
*B25J 5/00*    (2006.01)
(Continued)

(52) U.S. Cl.
CPC ............ *B65G 1/0492* (2013.01); *B25J 5/007* (2013.01); *B65G 1/1373* (2013.01); *B66F 9/06* (2013.01);
(Continued)

(58) Field of Classification Search
CPC ... B65G 1/0492; G05B 19/41895; B25J 5/007
See application file for complete search history.

(56) References Cited

U.S. PATENT DOCUMENTS

| 4,678,390 A | 7/1987 | Bonneton et al. |
| 5,211,523 A | 5/1993 | Andrada Galan et al. |

(Continued)

FOREIGN PATENT DOCUMENTS

| CN | 204872439 U | 12/2015 |
| JP | 7-47403 B2 | 5/1995 |

(Continued)

OTHER PUBLICATIONS

Japanese-language third-party filing in a post-grant opposition proceeding in counterpart Japanese Patent No. 6510436 dated Dec. 5, 2019 with English translation (47 pages).

(Continued)

*Primary Examiner* — Thomas Randazzo
(74) *Attorney, Agent, or Firm* — Crowell & Moring LLP

(57) ABSTRACT

An article conveyance system includes a controller and a conveyance device. The controller includes: a storage section storing information concerning a position of a housing section stored in a shelf; a housing-section retrieving section retrieving, based on the information concerning the position of the housing section, housing positions of a plurality of the housing sections, which are picking targets, in the shelf; a route generating section generating a route that makes rounds of positions of the housing sections retrieved by the housing-section retrieving section; and a transmitting sec- (Continued)

tion transmitting information concerning the generated route and the housing positions of the housing sections to the conveyance device. The conveyance device includes: an acquiring section acquiring the plurality of housing sections based on the housing positions of the housing sections while autonomously moving according to the information concerning the route; and a loading section loading the acquired plurality of housing sections.

15 Claims, 26 Drawing Sheets

(51) Int. Cl.
*G06Q 10/08* (2012.01)
*B66F 9/06* (2006.01)
*G05B 19/418* (2006.01)
*B65G 1/137* (2006.01)

(52) U.S. Cl.
CPC ........ *B66F 9/063* (2013.01); *G05B 19/41895* (2013.01); *G06Q 10/087* (2013.01); *B65G 2203/0233* (2013.01); *G05D 2201/0216* (2013.01)

(56) References Cited

U.S. PATENT DOCUMENTS

| | | | | |
|---|---|---|---|---|
| 8,649,899 | B2* | 2/2014 | Wurman | B65G 1/137 235/385 |
| 9,550,624 | B2* | 1/2017 | Khodl | B65G 1/1378 |
| 10,214,354 | B2* | 2/2019 | Toebes | G06Q 10/087 |
| 2004/0010337 | A1* | 1/2004 | Mountz | G05D 1/0297 700/214 |
| 2013/0054077 | A1* | 2/2013 | Waltz | B66F 9/063 701/25 |
| 2015/0142277 | A1* | 5/2015 | Eriksson | B66C 13/48 701/50 |
| 2016/0107838 | A1* | 4/2016 | Swinkels | B65G 1/0492 414/273 |
| 2016/0229631 | A1 | 8/2016 | Kimura et al. | |
| 2016/0236869 | A1 | 8/2016 | Kimura et al. | |
| 2016/0280461 | A1 | 9/2016 | Geiger et al. | |
| 2017/0203920 | A1* | 7/2017 | Otto | B65G 1/0492 |

FOREIGN PATENT DOCUMENTS

| | | |
|---|---|---|
| JP | 11-322027 A | 11/1999 |
| JP | 2004-277062 A | 10/2004 |
| JP | 2005-206272 A | 8/2005 |
| JP | 2005-255395 A | 9/2005 |
| JP | 2006-518322 A | 8/2006 |
| JP | 2012-232852 A | 11/2012 |
| JP | 2013-522144 A | 6/2013 |
| JP | 2013-216476 A | 10/2013 |
| JP | 2013-230942 A | 11/2013 |
| JP | 5377961 B2 | 12/2013 |
| JP | 2015-522492 A | 8/2015 |
| JP | 2015-533749 A | 11/2015 |
| WO | WO 2004/069699 A2 | 8/2004 |
| WO | WO 2007/011814 A2 | 1/2007 |
| WO | WO 2007/149711 A2 | 12/2007 |
| WO | WO 2008/085638 A2 | 7/2008 |
| WO | WO 2011/113053 A1 | 9/2011 |
| WO | WO 2013/155107 A1 | 10/2013 |
| WO | WO 2014/058653 A2 | 4/2014 |
| WO | WO 2015/052825 A1 | 4/2015 |
| WO | WO 2015/070841 A1 | 5/2015 |
| WO | WO 2015/097736 A1 | 7/2015 |

OTHER PUBLICATIONS

Japanese-language Notice of Reason for Cancellation issued in counterpart Japanese Patent No. 6510436 dated Jan. 10, 2020 with English translation (11 pages).
Chinese-language Office Action issued in counterpart Chinese Application No. 201780003227.3 dated Apr. 8, 2019 with English translation (16 pages).
Japanese-language Office Action issued in Japanese Application No. 2019-071752 dated Feb. 25, 2020 with English translation (18 pages).
International Search Report (PCT/ISA/220 & PCT/ISA/210) issued in PCT Application No. PCT/JP2017/003034 dated Apr. 11, 2017 with English translation (five pages).
Japanese-language Written Opinion (PCT/ISA/237) issued in PCT Application No. PCT/JP2017/003034 dated Apr. 11, 2017 (four pages).

* cited by examiner

| ORDER ID | ARTICLE ID | NUMBER OF PICKED ARTICLES | DELIVERY DESTINATION |
|---|---|---|---|
| 0001 | st1 | 3 | ○○○ |
| ... | ... | ... | ... |

| SHELF ID | SHELF POSITION ID | TRAY POSITION | TRAY ID | TRAY POSITION | TRAY ID | ... |
|---|---|---|---|---|---|---|
| A1 | sh11 | 1-1 | tr11 | 1-2 | tr23 | ... |
| A2 | sh22 | 1-1 | tr3 | 1-2 | tr6 | ... |
| ... | ... | ... | ... | ... | ... | ... |

| TRAY ID | TRAY WEIGHT | LONGITUDINAL SIZE | LATERAL SIZE | DEPTH SIZE | ARTICLE ID | NUMBER OF ARTICLES |
|---|---|---|---|---|---|---|
| tr1 | 500 | 30 | 50 | 60 | st34 | 55 |
| ... | ... | ... | ... | ... | ... | ... |

| ARTICLE ID | WEIGHT |
|---|---|
| st1 | 11 |
| st2 | 15 |
| ... | ... |

| SHELF ID | SHELF POSITION ID | SHELF TYPE | TRAY POSITION | TRAY ID | TRAY POSITION | TRAY ID | ... |
|---|---|---|---|---|---|---|---|
| A1 | sh11 | FIXED | 1-1 | tr11 | 1-2 | tr23 | ... |
| A3 | sh31 | MOVABLE | 1-1 | tr31 | 1-2 | tr61 | ... |
| ... | ... | ... | ... | ... | ... | ... | ... |

ARTICLE TRANSPORTATION SYSTEM, TRANSPORTATION DEVICE, AND ARTICLE TRANSPORTATION METHOD

TECHNICAL FIELD

The present invention relates to a technique of an article conveyance system, a conveyance device, and an article conveyance method for supporting work in a warehouse or the like.

BACKGROUND ART

In a warehouse, a factory, or the like, there is picking work in which an operator takes out articles from a shelf according to an order. In order to take out articles from a shelf in which a large number of articles are stored, for example, there is a method of taking out, with a stacker crane, a tray or the like in which predetermined articles are stored and conveying the taken-out tray or the like to the operator with another device. The stacker crane is reciprocatingly moved along the shelf in which articles are stored. A slide fork is vertically movably provided in the stacker crane. As a technique concerning this method, for example, there is a technique described in Patent Literature 1.

Patent Literature 1 discloses an article conveyance method and an article conveyance system which "when a plurality of operation instructions to an article conveyer are received, select a specific operation instruction out of the operation instructions based on predetermined allocation processing, set the selected specific operation instruction as a basic operation instruction, combine at least one of unselected operation instructions and the basic operation instruction as a complex operation instruction, and, after setting a plurality of complex operation instructions, respectively calculate predicted operation times of the article conveyer based on the complex operation instructions, select a complex operation instruction with the shortest calculated predicted operation time, and actuate the article conveyer based on the selected complex operation instruction" (see the abstract).

There is a method of lifting, with a carrier, articles stored in a shelf together with the shelf and conveying the articles to an operator. As a technique related to this method, there is, for example, a technique described in Patent Literature 2.

Patent Literature 2 discloses a method and a system for taking out an inventory of items in an inventory item system "the method including: a step of receiving a take-out request for designating an inventory item; a step of selecting, from a plurality of inventory item stations, any inventory item station that satisfies the take-out request; a step of selecting an inventory item holder from a plurality of inventory item holders that store the inventory item; and a step of selecting, from a plurality of self-powered movement driving units, any movement driving unit that freely moves the selected inventory item holder in a work space and moving the selected inventory item holder to the selected inventory item station" (see claim 1).

CITATION LIST

Patent Literature

Patent Literature 1: Japanese Patent Application Publication No. 2005-206272
Patent Literature 2: Japanese Patent No. 05377961

SUMMARY OF INVENTION

Technical Problem

In the technique described in Patent Literature 1, a rail is set along the shelf that store articles. The rail rises or moves left and right, so that the stacker crane moves on the rail and articles to be conveyed are taken out. The taken-out articles are conveyed to the operator in order. Accordingly, when articles are stored in the tray and the stacker crane conveys the tray, the operator has to take out the articles from one tray in order. Hence, the operator cannot collectively take out articles from a plurality of trays. That is, in the technique described in Patent Literature 1, the trays can only be conveyed one by one. When the picking work from one tray ends, a waiting time for the operator occurs until the next tray is conveyed.

In the technique described in Patent Literature 2, since the shelf is conveyed to the operator, commodities unnecessary for picking stored in the same shelf are simultaneously conveyed. A waste occurs in the conveyance. Therefore, there is a problem in that conveyance efficiency is deteriorated.

The present invention has been devised in view of such a background, and an object of the present invention is to improve work efficiency of article conveyance.

Solution to Problem

To solve the above problems, the present invention provides an article conveyance system including: a controller including: a storage section having stored therein information concerning a position of a housing section stored in a shelf; a housing-section retrieving section that retrieves, based on the information concerning the position of the housing section, housing positions of a plurality of the housing sections, which are picking targets, in the shelf; a route generating section that generates a route that makes rounds of positions of the housing sections retrieved by the housing-section retrieving section; and a transmitting section that transmits information concerning the generated route and the housing positions of the housing sections to a conveyance device; and the conveyance device including: an acquiring section that acquires the housing sections based on the housing positions of the housing sections while autonomously moving according to the information concerning the route; and a loading section that loads the acquired plurality of housing sections.

Other solving means are described in embodiments as appropriate.

Advantageous Effects of Invention

According to the present invention, it is possible to improve work efficiency of article conveyance.

BRIEF DESCRIPTION OF DRAWINGS

FIG. 6 is a diagram showing an example of order data according to the embodiment.

FIG. 7 is a diagram showing an example of shelf data according to the embodiment.

FIG. 8 is a diagram showing an example of tray data according to the embodiment.

FIG. 9 is a diagram showing an example of article data according to the embodiment.

DESCRIPTION OF EMBODIMENTS

Modes for carrying out the present invention (referred to as "embodiments") are explained in detail with reference to the drawings as appropriate.

First Embodiment

In a first embodiment, in a warehouse where a plurality of articles are stored, work for taking out articles corresponding to an order and sorting the articles to delivery destinations of the articles is explained as an example. Note that application of this embodiment is not limited to the warehouse and may be a factory and the like.

(Schematic Configuration of a System)

Figure 1:
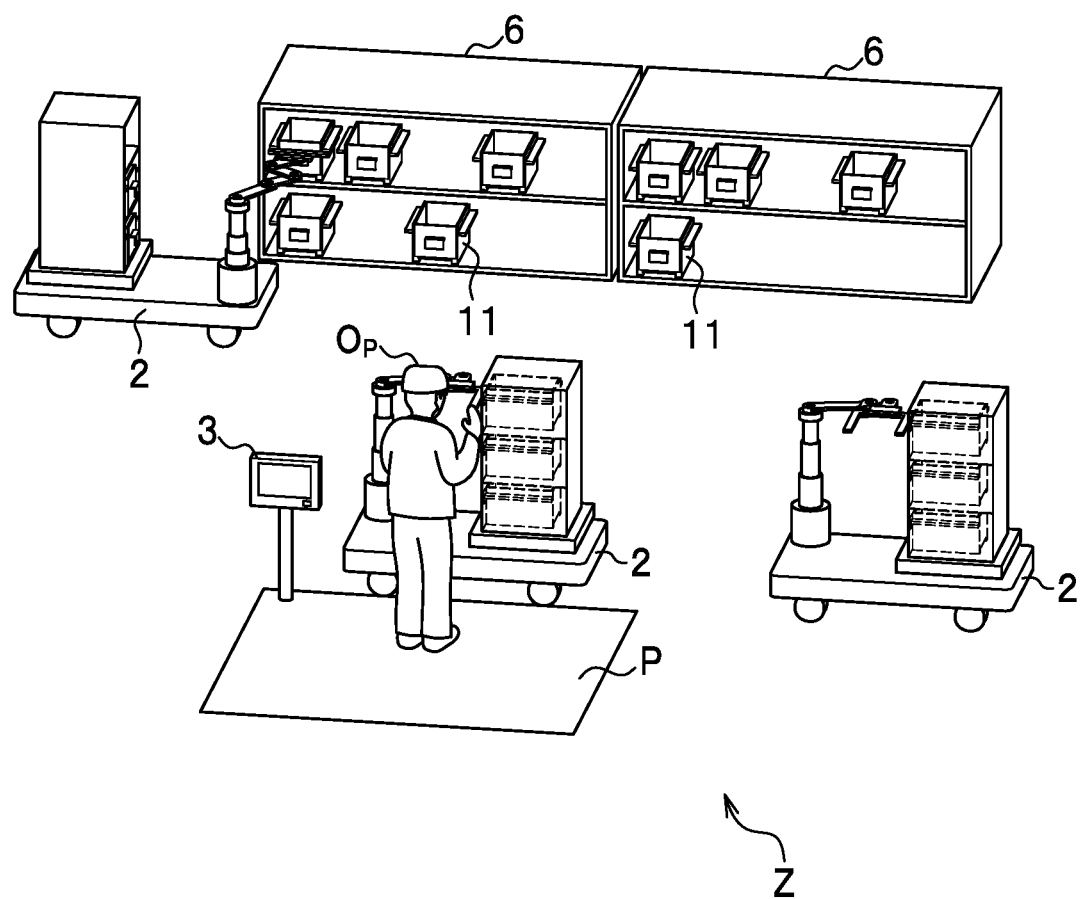
FIG. 1 is a diagram showing a schematic configuration of an article conveyance system according to a first embodiment.

FIG. 1 is a diagram showing a schematic configuration example of an article conveyance system according to the first embodiment.

In an article conveyance system Z set in a warehouse, a plurality of fixed shelves 6, in which trays (housing sections) 11 that house articles are stored, are set.

A tray carrier (a conveyance device) 2 makes rounds among the fixed shelves 6. The tray carrier 2 takes out the trays 11 and loads and holds the taken-out trays 11 on the tray carrier 2 itself in order. When all predetermined trays 11 are taken out and loaded, the tray carrier 2 moves to a work station P. Note that a detailed configuration of the tray carrier 2 is explained below.

An operator Op stays on standby in the work station P. When the tray carrier 2 loads and conveys a plurality of trays 11, the operator Op carries out, according to an instruction transmitted from a controller 1 (FIG. 2), picking work for taking out a predetermined number of articles from the predetermined trays 11 conveyed by the tray carrier 2. The operator Op performs the picking work, for example, referring to content displayed on a station terminal 3 set in the work station P.

When all the instructed picking work ends, the operator Op notifies the work end to the controller 1. For example, the operator Op presses a work end button (not shown in the figure) provided in the station terminal 3 to notify the work end to the controller 1. Even if the operator Op does not notify the work end, a sensor or the like set in the work station P may automatically detect work end timing and notify the work end to the controller 1. The sensor is a barcode reader (not shown in the figure) or the like. The operator Op hangs a barcode stuck to an article over the barcode reader, so that the barcode reader determines which article is picked. When all articles set as picking targets are picked, the barcode reader may notify a work end to the controller 1.

When receiving the picking work end notification from the controller 1, the tray carrier 2 leaves the work station P and returns the trays 11 to positions of a predetermined fixed shelf 6 one by one. The trays 11 may be returned to positions where the trays 11 are taken out or the returning positions may be determined from a state of the order according to use frequencies of the trays 11. The tray carrier 2 may directly unload the loaded trays 11 to predetermined positions. That is, the tray carrier 2 may unload the trays 11 to the predetermined positions without returning the tray 11 to the fixed shelf 6.

(Hardware Configuration Diagram)

Figure 2:
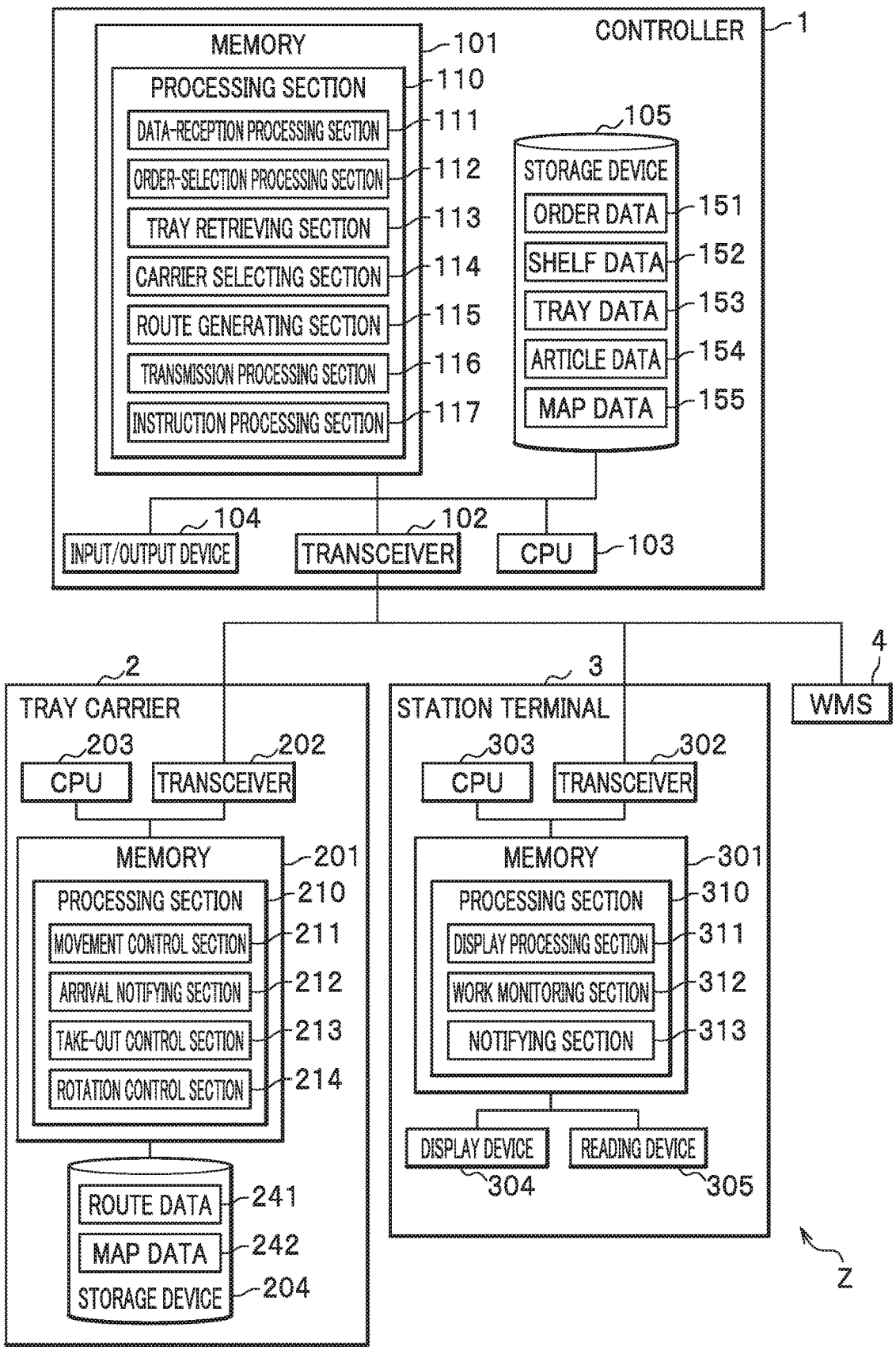
FIG. 2 is a diagram showing a hardware configuration example of the article conveyance system according to the first embodiment.

FIG. 2 is a diagram showing a hardware configuration example of the article conveyance system according to the first embodiment. FIG. 1 is referred to as appropriate.

The article conveyance system Z includes a WMS (Warehouse Management System) 4, the controller 1, the tray carrier 2, and the station terminal 3.

<WMS>

The WMS 4 manages data concerning articles and data concerning work in a warehouse or a factory. The data concerning the articles includes, for example, article storage data in which identification information of the articles, identification information of the trays 11 in which the articles are stored, position information of the fixed shelves 6, and the like are registered. The data concerning the work includes, for example, an order in which, for example, a relation between delivery destinations and identification information of articles delivered to the delivery destinations is registered. The WMS 4 generates order data 151 based on an order input via a not-shown input device and transmits the order data 151 to the controller 1. The WMS 4 transmits the article storage data to the controller 1.

<Controller>

The controller 1 manages an order transmitted from the WMS 4 and gives an instruction for loading and conveyance of the trays 11 to the tray carrier 2.

The controller 1 is a general computer and includes a memory 101, a transceiver 102, a CPU (Central Processing Section) 103, an input/output device 104, and a storage device 105. The memory 101, the input/output device 104, the transceiver 102, the CPU 103, and the storage device 105 are connected to one another via a bus.

The CPU 103 executes various kinds of arithmetic processing.

The storage device 105 is a nonvolatile non-transitory storage medium. Various programs and various data are stored in the storage device 105.

The memory 101 is a volatile transitory storage medium. The various programs and various data stored in the storage device 105 are loaded to the memory 101. The CPU 103 executes the various programs loaded to the memory 101 and reads and writes the various data loaded to the memory 101. As a result, in the memory 101, a processing section 110 and a data-reception processing section 111, an order-selection processing section 112, a tray retrieving section (a housing-section retrieving section) 113, a carrier selecting section (a conveyance-device selecting section) 114, a route generating section 115, a transmission processing section 116, and an instruction processing section 117 configuring the processing section 110 are embodied.

The data-reception processing section 111 receives order data 151 from the WMS 4 and stores the received order data 151 in the storage device 105. The data-reception processing section 111 receives article storage data from the WMS 4 and stores the received article storage data as shelf data 152, tray data 153, and article data 154 in the storage device 105. The data-reception processing section 111 also receives information transmitted from the tray carrier 2 and the station terminal 3.

The order-selection processing section 112 selects one or a plurality of orders used for work in the order data 151 received by the data-reception processing section 111. The orders may be selected in order of reception or may be selected based on some standard.

The tray retrieving section 113 searches through the tray data 153 and the shelf data 152 to retrieve positions of the trays 11 in which articles corresponding to the order selected by the order-selection processing section 112 are housed.

The route generating section 115 generates a round route (referred to as route as appropriate) of the tray carrier 2 traveling to the work station P after taking out the trays 11 to be conveyed. The route is retrieved and managed using a map coordinate of a target area where the tray carrier 2 moves stored in map data 155. Note that, as the route, a node, an ID (Identification) of a link, or the like may be used rather than such a map coordinate. As the route, the shortest route is calculated in which the tray carrier 2 accesses storage positions of all the trays 11 set as picking targets. Such the shortest route can be calculated using, for example, a combinational optimization method for solving a traveling salesman problem.

The transmission processing section 116 creates, as an instruction, information concerning a route based on conveyance order created by the route generating section 115 and the trays 11 to be conveyed and transmits the information to the tray carrier 2.

The transmission processing section 116 transmits the information to the WMS 4 and the station terminal 3 as well.

When the controller 1 receives an arrival notification transmitted by the tray carrier 2 when the tray carrier 2 arrives at the work station P, the instruction processing section 117 generates picking instruction data including identification information of an order and identification information of the trays 11. The picking instruction data is transmitted to the station terminal 3 by the transmission processing section 116.

In the storage device 105, the order data 151, the shelf data (a storage section) 152, the tray data 153, the article data 154, the map data 155, and the like are stored.

The order data 151 is data generated by the WMS 4. The order data 151 is data concerning a transmitted order of picking. Identification information of articles to be delivered, the number of the articles to be delivered, information concerning delivery destinations, and the like are registered.

In the shelf data 152, data concerning positions of the fixed shelves 6 in the warehouse and positions where the trays 11 are stored and the like are registered.

In the tray data 153, structures of the individual trays 11, data concerning articles stored in the trays 11, and the like are registered.

In the article data 154, data concerning individual articles and the like are registered.

The map data 155 is data concerning a map of a region (the warehouse) where the tray carrier 2 travels.

Note that the order data 151, the shelf data 152, the tray data 153, and the article data 154 are explained below.

In this embodiment, the order data 151, the shelf data 152, the tray data 153, and the article data 154 are generated based on the article storage data transmitted from the WMS 4. However, not only this, but these data may be stored in the storage device 105 of the controller 1 in advance.

The transceiver 102 includes an interface for communicating data between the transceiver 102 and the WMS 4 and an interface for communicating data between the transceiver 102 and the station terminal 3. Further, the transceiver 102 also includes an interface for communicating data between the transceiver 102 and the tray carrier 2. Note that the controller 1, the WMS 4, and the station terminal 3 may be connected by wire or may be connected by radio. It is assumed that the controller 1 and the tray carrier 2 are connected by radio.

<Tray Carrier>

The tray carrier 2 moves according to an instruction received from the controller 1. The tray carrier 2 takes out predetermined trays 11 from the fixed shelf 6 and loads and conveys the trays 11. When finishing taking out all the instructed trays 11, the tray carrier 2 moves to the work station P. When arriving at the work station P, the tray carrier 2 transmits an arrival notification to the controller 1.

The tray carrier 2 includes a memory 201, a transceiver 202, a CPU 203, and a storage device 204. The memory 201, the transceiver 202, the CPU 203, and the storage device 204 are connected to one another via a bus.

The CPU 203 executes various kinds of arithmetic processing.

The storage device 204 is a nonvolatile non-transitory storage medium. Various data are stored in the storage device 204.

The memory 201 is a volatile transitory storage medium. In the memory 201, various programs are executed by the CPU 203 and the various data are read and written. As a result, in the memory 201, a processing section 210 and a movement control section 211, an arrival notifying section 212, a take-out control section 213, and a rotation control section 214 configuring the processing section 210 are embodied.

The movement control section 211 moves the tray carrier 2 according to an instruction (a route) transmitted from the controller 1.

When the tray carrier 2 arrives at the work station P, the arrival notifying section 212 transmits an arrival notification, which is information indicating that the tray carrier 2 arrives at the work station P, to the controller 1.

The take-out control section 213 controls a take-out device (FIG. 3) explained below.

The rotation control section 214 controls a rotating section 271 (FIG. 14) explained below. Note that, when the tray carrier 2 does not include the rotating section 271, the rotation control section 214 may be omitted.

In the storage device 204, route data 241 included in the instruction transmitted from the controller 1 and map data 242 for matching the route data 241 and the position of the tray carrier 2 are stored.

<Station Terminal>

The station terminal 3 displays, based on picking instruction data received from the instruction processing section 117, on a display device 304, an instruction for taking out a predetermined number of articles from the positions of the trays 11. The operator Op carries out picking work of the articles based on the instruction displayed on the display device 304. When the picking work ends, the station terminal 3 transmits a work end notification to the controller 1.

The station terminal 3 includes a memory 301, a transceiver 302, a CPU 303, the display device 304, and a reading device 305. The memory 301, the transceiver 302, the CPU 303, the display device 304, and the reading device 305 are connected to one another via a bus.

The CPU 303 executes various kinds of arithmetic processing.

The memory 301 is a volatile transitory storage medium. In the memory 301, various programs are executed by the CPU 303 and various data are read and written. As a result, a processing section 310 and a display processing section 311, a work monitoring section 312, and a notifying section 313 configuring the processing section 310 are embodied.

The display processing section 311 causes, based on picking instruction data transmitted from the controller 1, the display device 304 to display a picking instruction.

The work monitoring section 312 monitors a progress degree of picking work based on information read by the reading device 305.

When the picking work ends, the notifying section 313 transmits a work end notification to the controller 1.

The display device 304 displays the picking instruction to the operator Op.

The reading device 305 is a barcode reader, an RFID reader, or the like. The reading device 305 reads information of a barcode or an RFID tag stuck to articles.

<Detailed Configuration of the Tray Carrier>

Figure 3:
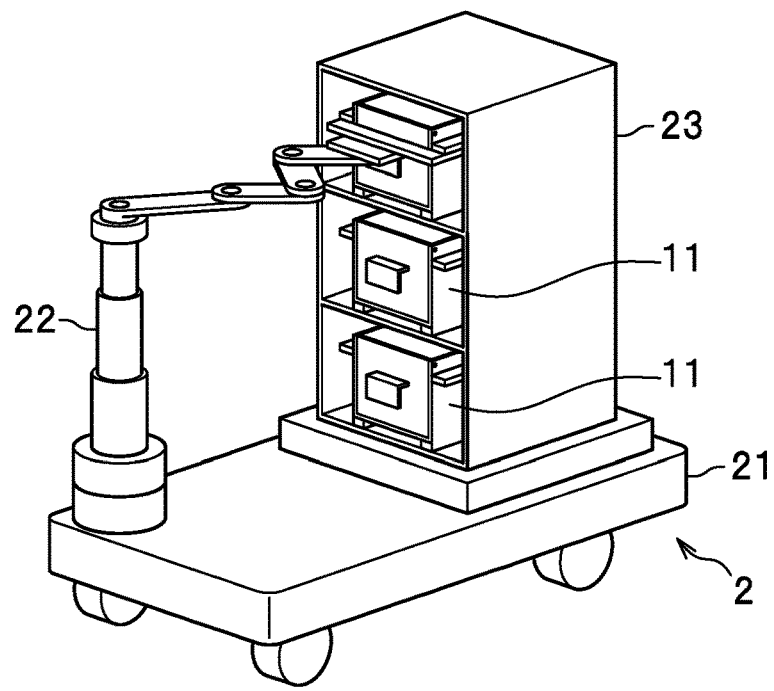
FIG. 3 is a diagram showing an exterior example of a tray carrier according to the embodiment.

FIG. 3 is a diagram showing an exterior example of the tray carrier according to this embodiment.

The tray carrier 2 includes a main body section 21, a take-out device 22, and a storing section 23. Wheels are set in a lower part of the main body section 21. The tray carrier 2 is capable of, for example, moving forward, moving backward, and changing a direction.

The take-out device 22 takes out the trays 11 from the fixed shelf 6 (FIG. 1) and stores the taken-out trays 11 in the storing section 23 set in the main body section 21. Details of the take-out device 22 are explained below.

Figure 4:
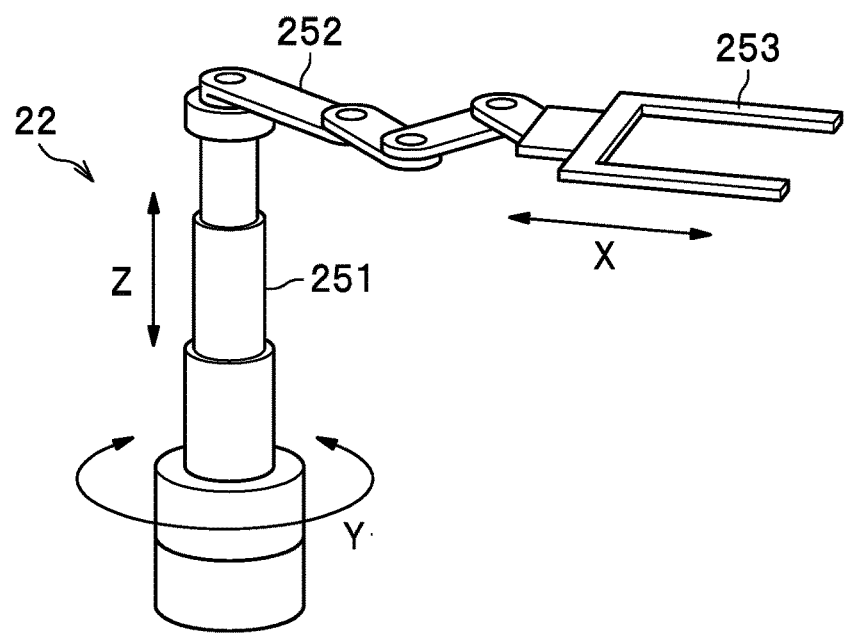
FIG. 4 is a diagram showing one of specific configuration examples of a take-out device.

FIG. 4 is a diagram showing one of specific configuration examples of the take-out device.

As shown in FIG. 4, the take-out device 22 includes a vertical telescopic section 251, an arm section 252, and a catcher section 253.

As shown in FIG. 4, the vertical telescopic section 251 is rotatably set in the main body section 21 of the tray carrier 2. The vertical telescopic section 251 is, for example, a multi-stage telescopic cylinder extended and retracted by a multi-stage hydraulic cylinder provided on the inside of the vertical telescopic section 251. The vertical telescopic section 251 is capable of extending and retracting in the vertical direction (a Z direction in the figure). Note that the vertical telescopic section 251 is not limited to this configuration.

The arm section 252 is set in an upper part of the vertical telescopic section 251. For example, the arm section 252 is capable of extending and retracting in the horizontal direction (an X direction in the figure) with a mechanism shown in FIG. 4. Note that an extending and retracting mechanism of the arm section 252 is not limited to the mechanism shown in FIG. 4. A linear motion guide rail mechanism or the like may be used.

The catcher section 253 of a fork type is attached to the distal end of the arm section 252.

Figure 5:
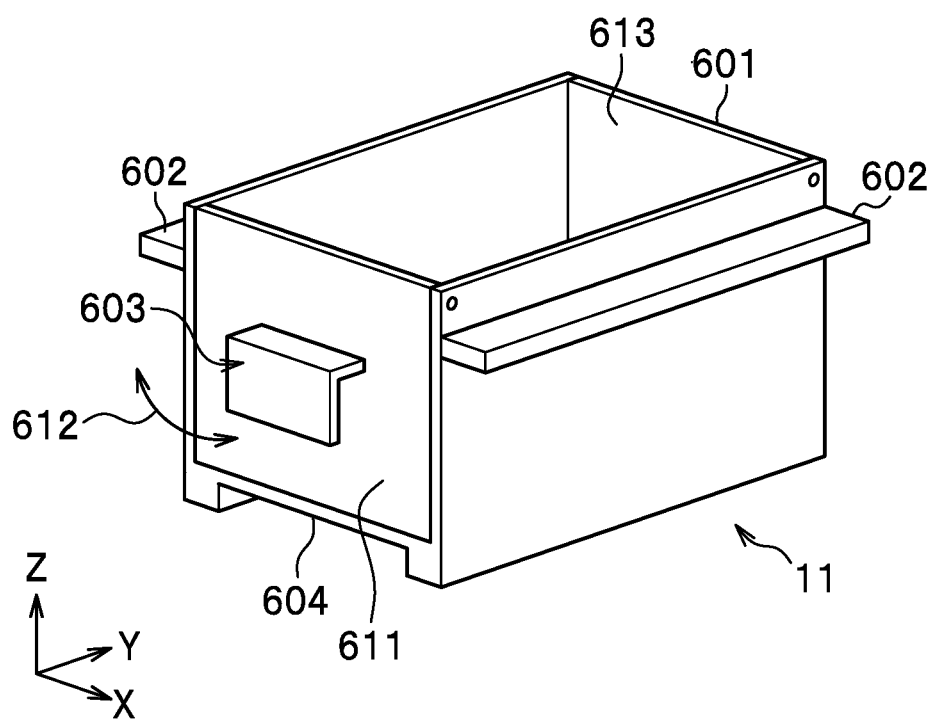
FIG. 5 is a diagram showing one of specific configuration examples of a tray according to the embodiment.

FIG. 5 is a diagram showing one of specific configurations of the tray according to this embodiment.

In the tray 11, claws 602 are provided on the left and right surfaces of a housing section 601. The catcher section 253 of the take-out device 22 are caught by the claws 602 to realize movement of the tray 11.

In the tray 11, hooks 603 are provided on the front surface and the rear surface (in FIG. 5, the hook 603 on the rear surface is hidden). Further, a concave hollow section 604 is provided in the bottom of the tray 11. Uses of the hooks 603 and the hollow section 604 are explained below.

Note that the tray 11 does not need to include all of the hooks 603, the claws 602, and the hollow section 604. It is also possible to adopt a configuration including one or a plurality of each of the components.

Note that it is assumed that a lid is not attached to an upper part of the tray 11. However, the lid may be attached.

Note that a surface 611 of the tray 11 is capable of opening and closing in a direction of an arrow 612. The operator Op takes out articles stored in the tray 11 by opening the surface 611. A surface 613 opposed to the surface 611 is also capable of opening and closing. Incidentally, in FIG. 1 and the like, to avoid complication of the figures, a structure for enabling the surface 611 to open and close is not shown.

Conveyance of the tray 11 by the take-out device 22 shown in FIG. 4 is explained with reference to FIG. 4 and FIG. 5.

As shown in FIG. 4, the catcher section 253 of the fork type is attached to the distal end of the arm section 252. The take-out device 22 inserts the catcher section 253 under the claws 602 provided on the left and right surfaces of the tray 11 according to rotation in a Y direction in the figure by the vertical telescopic section 251 and extension and retraction of the vertical telescopic section 251 and the arm section 252. Thereafter, the take-out device 22 extends the vertical telescopic section 251 to lift the tray 11. Thereafter, the arm section 252 retracts, so that the tray 11 is drawn out from the fixed shelf 6. When the drawn-out tray 11 is stored in the storing section 23 of the tray carrier 2, an operation opposite to the operation in drawing out the tray 11 is performed.

<Data Configuration>
(Order Data)

FIG. 6 is a diagram showing an example of the order data according to this embodiment.

The order data 151 includes fields of an order ID, an article ID, the number of picked articles, a delivery destination, and the like.

The order ID is identification information of an order given by the WMS 4 (FIG. 2) when the order is generated.

The article ID is identification information given to each article.

The number of picked articles is the number of articles to be picked.

The delivery destination is a delivery destination of the picked articles.

(Shelf Data)

FIG. 7 is a diagram showing an example of the shelf data according to this embodiment.

The shelf data 152 includes fields of a shelf ID, a shelf position ID, a tray position, and a tray ID. The tray position and the tray ID are a pair of information. A plurality of the pairs of information are stored with respect to the shelf ID.

The shelf ID is identification information given to each of the fixed shelves 6 (FIG. 1).

The shelf position ID is identification information indicating the position of the fixed shelf 6 in the warehouse. The shelf position ID is associated with a coordinate in a one-to-one relation in not-shown shelf position data and the like. Therefore, when the shelf position ID is decided, the position of the fixed shelf 6 in the warehouse is also decided. Note that, as the coordinate associated with the shelf position ID, a coordinate of the center of the fixed shelf 6 is conceivable. However, a coordinate of a portion other than the center may be used.

The tray position indicates the position of a frontage in the fixed shelf 6 in which the tray 11 is stored. The tray ID is identification information give to each of the trays 11. For example, the tray 11 having a tray ID "tr11" is stored in a first frontage from the left in a first stage from the bottom of the fixed shelf 6 having a shelf ID "A1" (a tray position "1-1"). Similarly, the tray 11 having a tray ID "tr23" is stored in a second frontage from the left in the first stage from the bottom of the fixed shelf 6 having the shelf ID "A1" (a tray position "1-2").

(Tray Data)

FIG. 8 is a diagram showing an example of the tray data according to this embodiment.

The tray data 153 includes fields of a tray ID, a tray weight, a longitudinal size, a lateral size, a depth size, an article ID, and the number of articles.

The tray ID is identification information given to each of the trays 11.

The tray weight is the weight of the tray 11 (not including the weight of articles stored in the tray 11).

The longitudinal size is the length in the longitudinal direction (a Z-axis direction of FIG. 5) of the tray 11.

The lateral size is the length in the lateral direction (an X-axis direction of FIG. 5) of the tray 11.

The depth size is the length in the depth direction (a Y-axis direction of FIG. 5) of the tray 11.

The article ID is identification information indicating an article stored in the tray 11 corresponding to the article ID.

The number of articles is the number of articles stored in the tray 11 corresponding to the number of articles.

For example, fifty-five articles indicated by an article ID "st34" are stored in the tray 11 having the tray ID "tr1".

(Article Data)

FIG. 9 is a diagram showing an example of the article data according to this embodiment.

The article data 154 includes fields of an article ID, which is identification information given to an article, and the weight of the article.

Note that, in the first embodiment, the fields of the tray weight, the longitudinal size, the lateral size, and the depth size of the tray data 153 and the article data 154 may be omitted.

(Flowchart)

Figure 10:
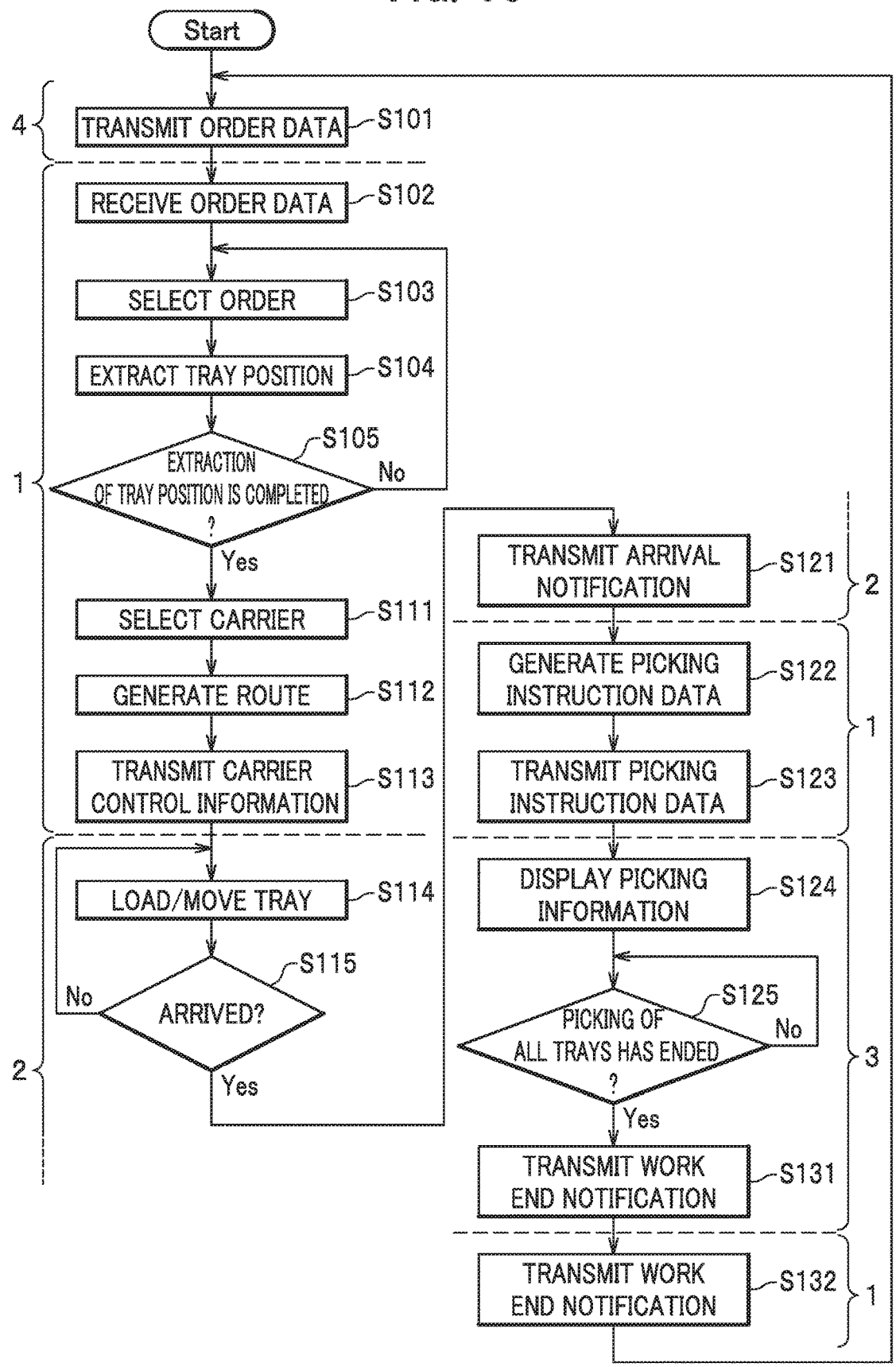
FIG. 10 is a flowchart showing a procedure of processing in a picking system according to the first embodiment.

FIG. 10 is a flowchart showing a procedure of processing in the picking system according to the first embodiment. FIG. 1 to FIG. 9 are referred to as appropriate.

First, the WMS 4 transmits the order data 151 (S101). The data-reception processing section 111 of the controller 1 receives the order data 151 (S102). The data-reception processing section 111 stores the received order data 151 in the storage device 105. The article storage data is transmitted from the WMS 4 in advance and stored in the storage device 105 of the controller 1 as the shelf data 152, the tray data 153, and the article data 154.

Subsequently, the order-selection processing section 112 selects one order out of the order data 151 (S103). Specifically, the order-selection processing section 112 acquires one or a plurality of unprocessed order records from the order data 151 in the storage device 105. As explained above, orders may be selected in reception order or may be selected based on some standard. Note that the number of orders to be selected is, for example, the number of shelves of the storing section 23.

Subsequently, the tray retrieving section 113 searches through the tray data 153 and the shelf data 152 and retrieves and extracts a position (a tray position) of the tray 11 set as a picking target (S104).

The extraction of the tray position is performed in the following procedure.

(A1) First, the tray retrieving section 113 acquires an article ID of the picking target from the order (the order record) selected in step S103.

(A2) Subsequently, the tray retrieving section 113 searches through the tray data 153 using the article ID acquired in (A1) as a key and acquires a tray ID of the tray 11 in which the article set as the picking target is housed.

(A3) The tray retrieving section 113 searches through the shelf data 152 using the tray ID acquired in (A2) as a key and acquires a shelf position ID and a tray position.

At this time, when articles of one kind are separately stored in a plurality of trays 11, the target-tray retrieving section 113 retrieves positions and identification information of the trays 11 concerning all the trays 11 in which the articles are stored.

Subsequently, the order-selection processing section 112 determines whether the extraction of the tray position is completed concerning all the orders (S105).

As a result of step S105, when the retrieval of the tray position is not completed concerning all the orders (No in S105), the order-selection processing section 112 returns the processing to step S103.

As a result of step S105, when the retrieval of the tray position is completed concerning all the orders (Yes in S105), the carrier selecting section 114 selects the tray carrier 2 based on the acquired shelf position ID (S111). The tray carrier 2 selected at this time is the tray carrier 2 that is traveling in a place closest to the acquired tray position and is not conveying the fixed shelf 6. Note that the controller 1 always grasps the position of the tray carrier 2.

Subsequently, the route generating section 115 generates a route based on the position of the tray carrier 2 selected in S111, the shelf position ID, and the tray position (S112). At this time, the route generating section 115 generates a route that makes rounds of all the trays 11 set as picking targets and has the shortest route distance.

The transmission processing section 116 transmits the route data 241 to the tray carrier 2 selected in step S111 and transmits carrier control information including the order ID, the shelf position, and the tray position as a set to the tray carrier 2 (S113). Note that the shelf position is acquired by retrieving not-shown shelf position data using the shelf position ID as a key as explained above.

The movement control section 211 of the tray carrier 2, which receives the route data 241 and the carrier control information, causes the tray carrier 2 to travel according to the route data 241. The movement control section 211 causes the tray carrier 2 move to the work station P while loading the tray 11 in the shelf position and the tray position included in the carrier control information (S114).

The movement control section 211 of the tray carrier 2 determines whether the tray carrier 2 has arrives at the work station P (S115). The processing in step S115 is a publicly-known technique. Therefore, detailed explanation of the processing is omitted.

As a result of step S115, when the tray carrier 2 has not arrives at the work station P (No in S115), the movement control section 211 returns the processing to step S114. The tray carrier 2 continues the movement.

As a result of step S115, when the tray carrier 2 has arrives at the work station P (Yes in S115), the arrival notifying section 212 transmits an arrival notification to the controller 1 (S121). The arrival notification includes an order ID.

The instruction processing section 117 of the controller 1, which receives the arrival notification, searches through the order data 151 and the tray data 153 using the order ID included in the arrival notification as a key. The instruction processing section 117 generates picking instruction data in which an order ID, a tray ID, an article ID, the number of picked articles, and the like form a set (S122).

The transmission processing section 116 transmits the generated picking instruction data to the station terminal 3 (S123).

The display processing section 311 of the station terminal 3, which receives the picking instruction data, displays picking information such as a tray ID, an article ID, and the number of picked articles on the display device 304 (S124). In step S124, the display processing section 311 may cause the display device 304 to display the position of the picking target tray 11 in the storing section 23. Such information can be managed as explained below. That is, identification information is attached to frontages in the storing section 23 of the tray carrier 2 in advance. The processing section 110 of the controller 1 determines in advance which tray 11 is stored in which frontage in the storing section 23 of the tray carrier 2. That is, the processing section 110 links and stores tray IDs and the identification information of the frontages of the storing section 23. This information is sent to the station terminal 3. Therefore, the display processing section 311 of the station terminal 3 can cause the display device 304 to display the position of the picking target tray 11 in the storing section 23.

The operator Op performs picking according to the display of the display device 304.

The work monitoring section 312 of the station terminal 3 determines whether the picking of all the trays 11 has ended 8 (S125).

For example, the work monitoring section 312 monitors work in a procedure explained below. In the station terminal 3, as shown in FIG. 2, the reading device 305 such as a barcode reader or an RFID reader is set. Every time the operator Op picks a picking target article, the operator Op hangs a barcode or an RFID tag stuck to the article over the reading device 305. The work monitoring section 312 manages the number of picked articles based on transmitted information concerning the articles.

As a result of step S125, when the picking of all the trays 11 has not ended (No in S125), the work monitoring section 312 returns the processing to step S125.

As a result of step S125, when the picking of all the trays 11 has ended (Yes in S125), the notifying section 313 of the station terminal 3 transmits a work end notification to the controller 1 (S131). The work end notification includes an order ID of an order for which work is ended.

The transmission processing section 116 of the controller 1, which receives the work end notification, transmits the work end notification to the WMS 4 (S132). The WMS 4, which receives the work end notification, returns the processing to step S101 and receives new order data 151 from the WMS 4.

Note that the processing in step S112 and step S113 may be performed at every predetermined time. In step S103, the order-selection processing section 112 may select, referring to the tray data 153 and the article data 154, an order such that the weight of the tray 11 to be conveyed does not exceed a predetermined weight.

Figure 11:
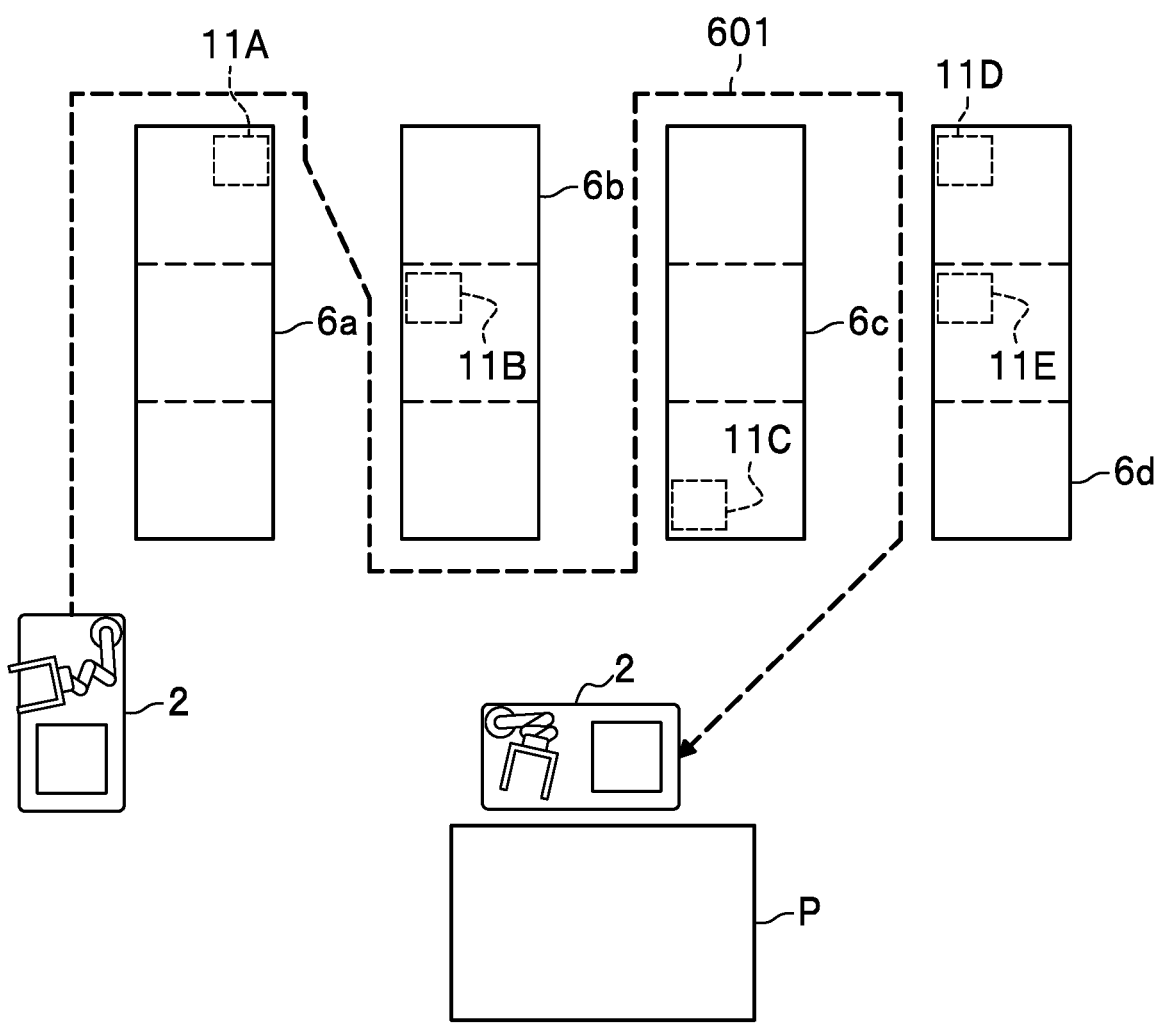
FIG. 11 is a diagram showing an example of a route generated by processing according to the first embodiment.

FIG. 11 is a diagram showing an example of the route generated by the processing shown in FIG. 10.

The tray carrier 2 takes out, in order, a tray 11A stored in a fixed shelf 6a, a tray 11B stored in a fixed shelf 6b, a tray 11C stored in a fixed shelf 6c, and a tray 11D and a tray 11E stored in a fixed shelf 6d. Thereafter, the tray carrier 2 loads the taken-out trays 11A to 11E and conveys the trays 11A to 11E to the work station P. The controller 1 sets the tray 11A nearest from the tray carrier 2 staying on standby as a first take-out target. Subsequently, the controller 1 sets the tray 11B nearest (at the shortest distance) from the tray 11A as the next round destination. Similarly, the controller 1 sets the tray 11C at a near distance from the tray 11B as a take-out target. Subsequently, similarly, the controller 1 generates a route 601 such that the tray carrier 2 makes rounds in the order of the tray 11C, the tray 11D, and the tray 11E.

(Modification of the Mechanisms in the Tray Carrier)

Figure 12:
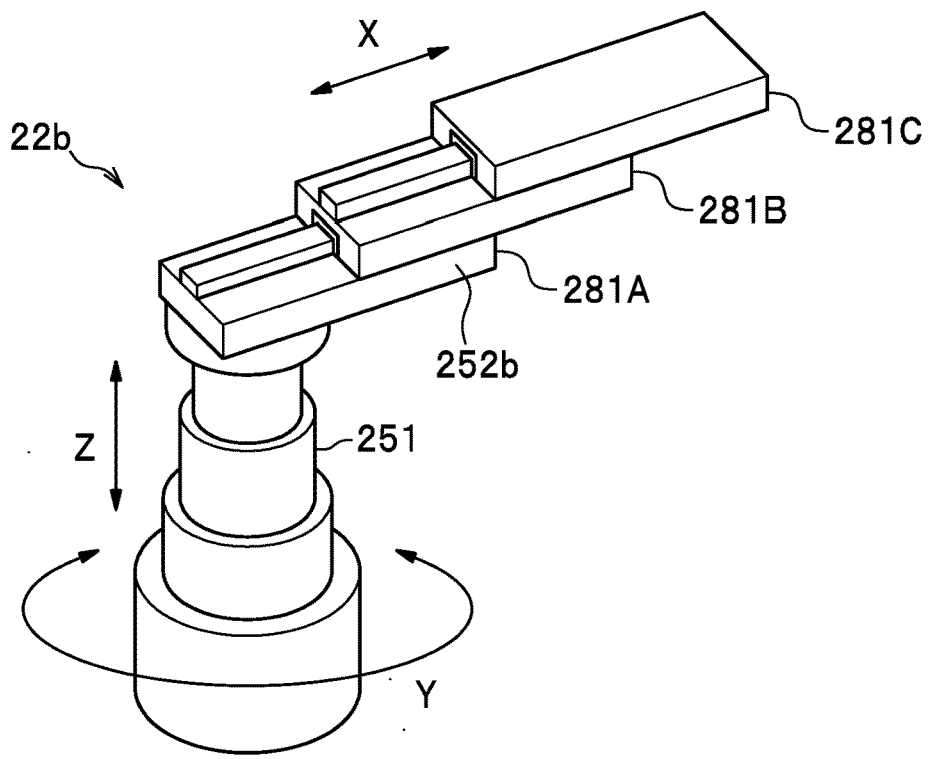
FIG. 12 is a diagram showing another modification of the take-out device in the first embodiment.

FIG. 12 is a diagram showing another modification of the take-out device in the first embodiment.

A take-out device 22b shown in FIG. 12 includes a vertical telescopic section 251 and a telescopic arm 252b.

The vertical telescopic section 251 is the same as the mechanism shown in FIG. 4. Therefore, explanation of the vertical telescopic section 251 is omitted.

The telescopic arm 252b includes arms 281A, 281B, and 281C. For example, pinion gears are provided in upper parts of the arms 281A and 281B among the arms 281A, 281B, and 281C. Rack gears (not shown in the figure) that mesh with the pinion gears are provided in lower parts of the arms 281B and 281C. The pinion gears rotate, so that the telescopic arm 252b linearly extends and retracts in an X direction in the figure. The telescopic arm 252b has structure including the arms 281A, 281B, and 281C in three stages. However, the telescopic arm 252b is not limited to the three stages.

Conveyance of the tray 11 by the take-out device 22b in FIG. 12 is explained with reference to FIG. 5 and FIG. 12.

As shown in FIG. 5, the hooks 603 are provided on the front surface and the rear surface of the tray 11 (in FIG. 5, the hook 603 on the rear surface is hidden).

The telescopic arm 252b shown in FIG. 12 is moved up and down and back and forth to be inserted into the hollow section 604 provided in the lower part of the tray 11 shown in FIG. 5. Thereafter, the vertical telescopic section 251 is extended, so that the tray 11 is lifted. Thereafter, the telescopic arm 252b retracts, the tray 11 is drawn out from the fixed shelf 6. When the drawn-out tray 11 is stored in the storing section 23 of the tray carrier 2, operation opposite to the operation at the time when the tray 11 is drawn out is performed.

Figure 13:
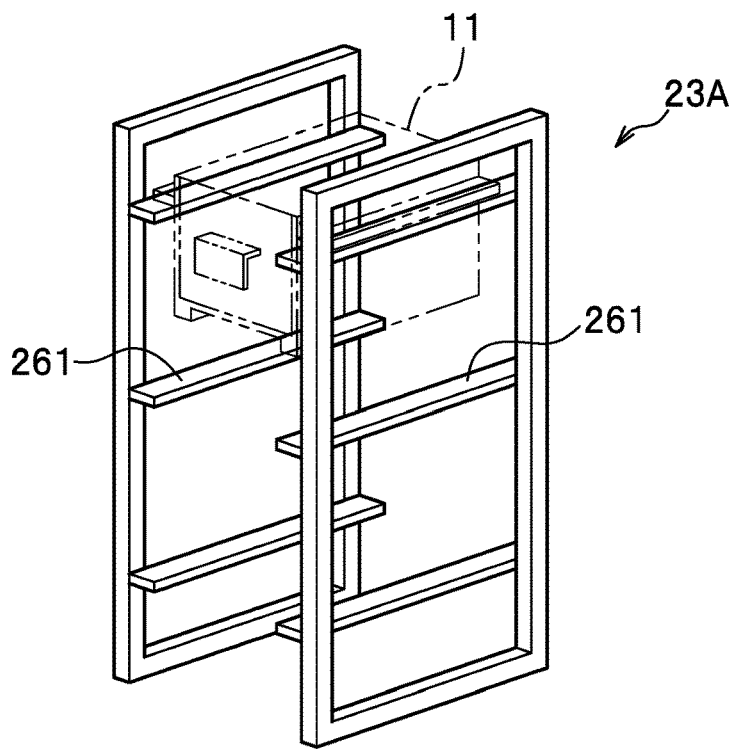
FIG. 13 is a diagram showing one of other modifications of a storing section in the first embodiment.

FIG. 13 is a diagram showing one of other modifications of the storing section in the first embodiment.

In a storing section 23A shown in FIG. 13, frames of a plurality of claw sections 261 are provided toward the inner side in two frames provided at the width of the fixed shelf 6. The claws 602 of the tray 11 shown in FIG. 5 is supported by the claw sections 261, so that the storing section 23A stores the tray 11.

Figure 14:
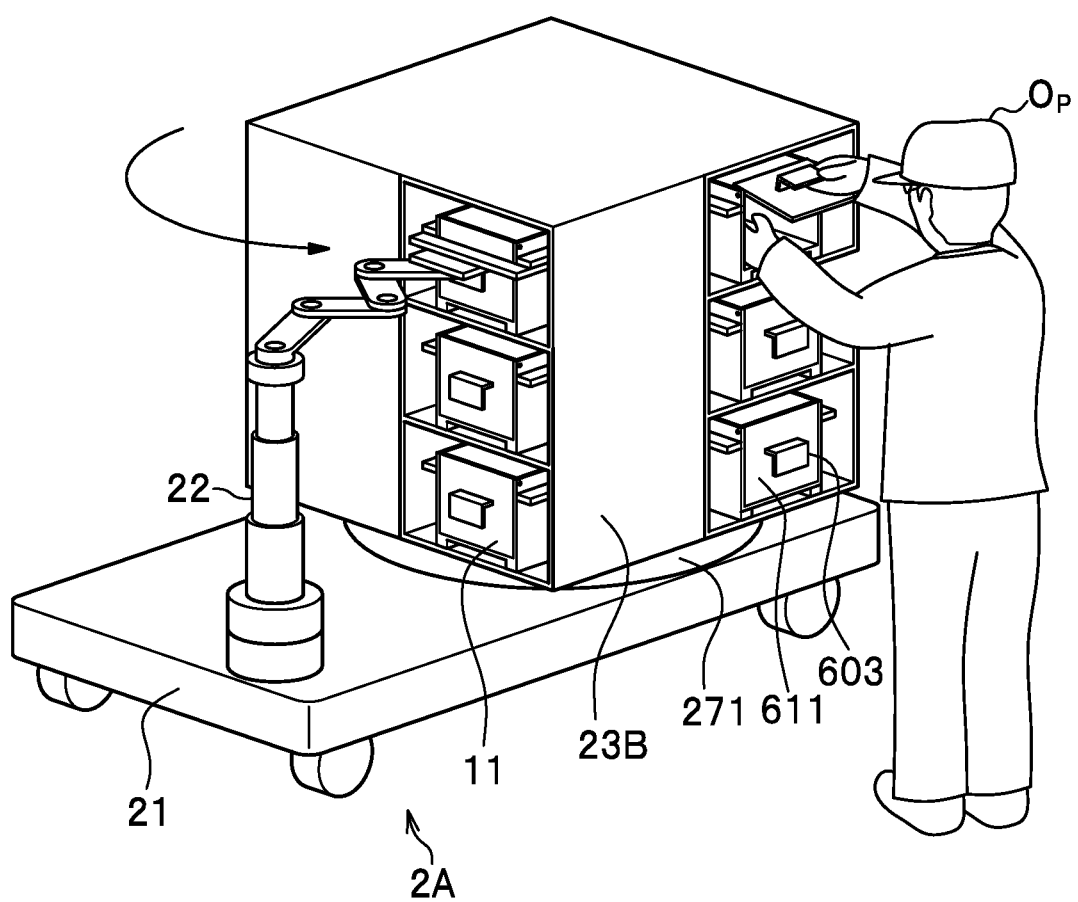
FIG. 14 is a diagram showing one of configuration examples of the tray carrier according to the first embodiment.

FIG. 14 is a diagram showing one of configuration examples of the tray carrier according to the first embodiment.

In FIG. 14, the same components as the components shown in FIG. 3 are denoted by the same reference numerals and signs and explanation of the components is omitted.

In a tray carrier 2A shown in FIG. 14, a rotating section 271 is provided under a storing section 23B shown in FIG. 3. When the tray carrier 2A arrives at the work station P (FIG. 1), the rotating section 271 rotates, so that take-out openings of the storing section 23B are directed to the direction of the operator Op. The processing section 210 of the tray carrier 2A easily detects in which direction the tray carrier 2A faces. Therefore, the rotation control section 214 easily calculates to which degree the rotating section 271 is rotated.

Note that the hooks 603 of the tray 11 also function as grips in opening and closing the surface 611 as shown in FIG. 14.

By adopting the configuration shown in FIG. 14, when the tray carrier 2A arrives at the work station P, it is possible to direct the take-out opening for the tray 11 to a direction in which the operator Op is present. Therefore, it is possible to improve efficiency of the picking work.

In the tray carrier 2A shown in FIG. 14, the storing section 23B has a rectangular parallelepiped shape. Take-out openings for the trays 11 are provided in the respective side surfaces of the storing section 23B. When the trays 11 are stored in the storing section 23B by the take-out device 22, the rotating section 271 rotates the storing section 23B to store the trays 11 in order in the take-out openings provided in the respective side surfaces. When the operator Op takes out the trays 11, the rotating section 271 rotates the storing section 23B, so that the trays 11 are taken out in order from the take-out openings provided in the respective side surfaces.

In this way, the tray carrier 2A can convey a larger number of trays 11 than the tray carrier 2 shown in FIG. 1.

Note that, in FIG. 14, the shape of the storing section 23B is the rectangular parallelepiped shape. The take-out openings for the trays 11 are provided in the respective side surfaces of the storing section 23B. However, not only this, but the tray carrier 2A may include the storing section 23 shown in FIG. 3.

As explained above, the identification information is attached to the frontages of the storing section 23B in advance to manage which tray 11 is stored in which frontage. This information is transmitted to the tray carrier 2. Therefore, the rotation control section 214 (FIG. 2) of the tray carrier 2 can determine to which degree the rotating section 271 is rotated.

Figure 15:
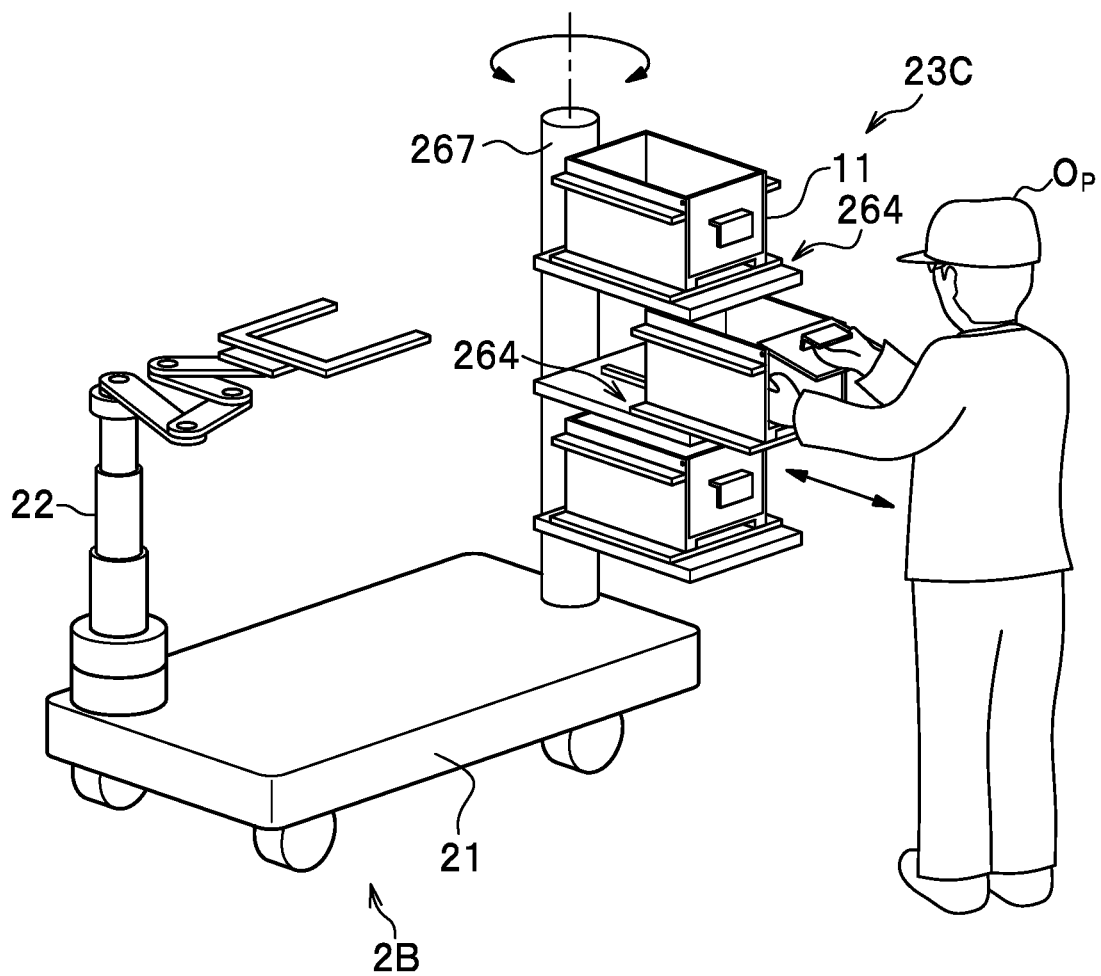
FIG. 15 is a diagram showing one of other configuration examples of the tray carrier according to the first embodiment.

FIG. 15 is a diagram showing one of other configuration examples of the tray carrier according to the first embodiment.

In a storing section 23C of a tray carrier 2B shown in FIG. 15, for example, a plurality of telescopic arms 264 in two stages are provided in the up-down direction (the Z-axis direction) with respect to a pole (a rotating section) 267. The trays 11 taken out from the fixed shelf 6 are placed on the telescopic arms 264 that are in a retracted state. In a state in which the trays 11 are placed on the telescopic arms 264, the tray carrier 2B travels to the work station P. When the tray carrier 2B arrives at the work station P, the telescopic arms 264 extend in a direction in which the operator Op is present, so that the trays 11 are stretched out to the operator Op.

Note that parts on which the trays 11 are placed may be simple tabular parts rather than the telescopic arms 264 shown in FIG. 15.

By adopting the configuration shown in FIG. 15, when the tray carrier 2B arrives at the work station P, the trays 11 are stretched out to the operator Op. Therefore, it is possible to improve efficiency of the picking work.

The pole 267 is rotatably provided. When the tray carrier 2B arrives at the work station P, the pole 267 rotates to direct take-out openings for the trays 11 on the telescopic arms 264 to the direction of the operator Op. In FIG. 15, a state is shown in which the pole 267 rotates and the take-out openings for the trays 11 face the direction of the operator Op.

Figure 16:
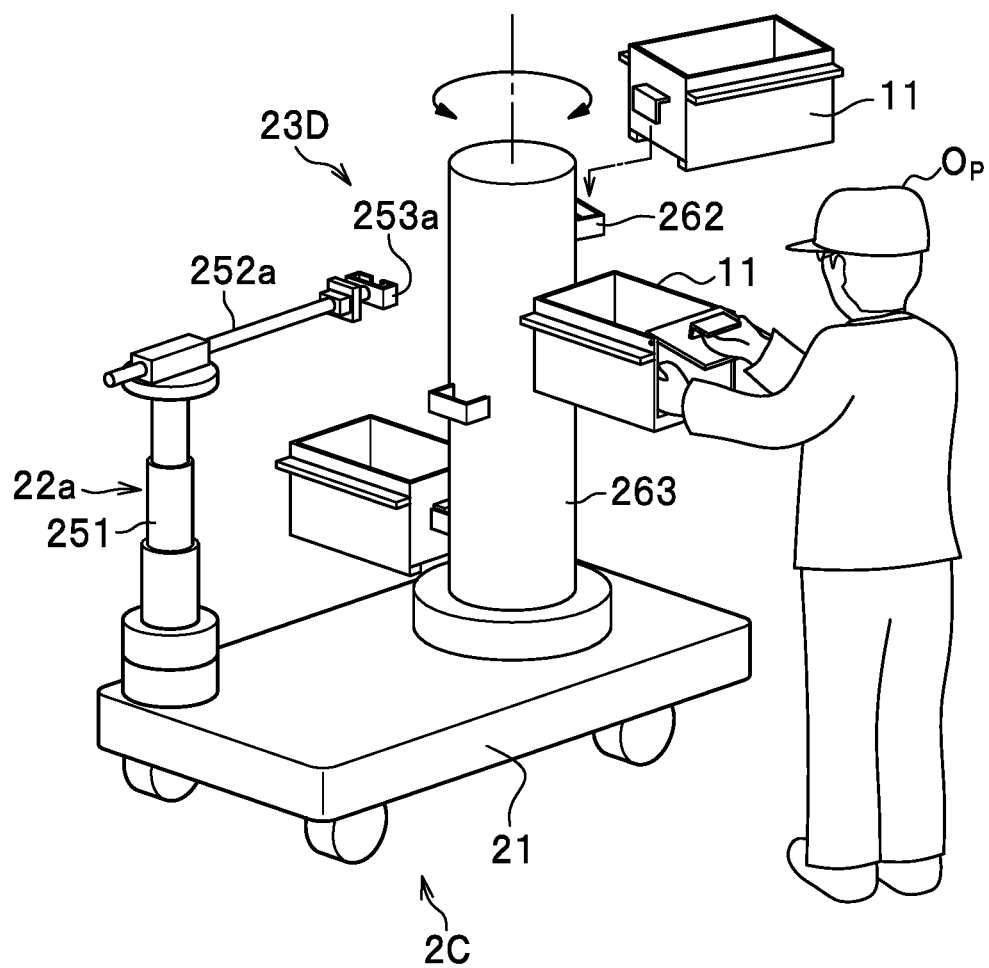
FIG. 16 is a diagram showing another configuration example of the tray carrier according to the first embodiment.

FIG. 16 is a diagram showing another configuration example of the tray carrier according to the first embodiment.

A take-out device 22a in a tray carrier 2C shown in FIG. 16 includes the vertical telescopic section 251, an arm section 252a, and a catcher section 253a.

The vertical telescopic section 251 is the same as the mechanism shown in FIG. 4. Therefore, explanation of the vertical telescopic section 251 is omitted.

The arm section 252a has a bar-like shape. The arm section 252a linearly extends and retracts in the X-axis direction in the figure with a stepping motor or the like set on the inside in an upper part of the vertical telescopic section 251. Note that the arm section 252a is not limited to the structure shown in FIG. 16 and may be, for example, the mechanism shown in FIG. 4.

The catcher section 253a attached to the distal end of the arm section 252a is formed as a hook.

A storing section 23D has a configuration in which a plurality of hooks 262 are provided in a pole (a rotating section) 263.

The operation of the take-out device 22a shown in FIG. 16 is explained with reference to FIG. 5 and FIG. 16.

After the hook of the catcher section 253a shown in FIG. 16 is caught by the hook 603 of the tray 11 shown in FIG. 5, the vertical telescopic section 251 extends, so that the tray 11 is lifted. Thereafter, the arm section 252a retracts, so that the tray 11 is drawn out from the fixed shelf 6. When the drawn-out tray 11 is stored in the storing section 23D of the tray carrier 2C, operation opposite to the operation at the time when the tray 11 is drawn out is performed.

The pole 263 is rotatably provided. When the tray carrier 2C arrives at the work station P, the pole 263 rotates to direct the picking target tray 11 to the direction of the operator Op.

Identification information is attached to the hooks 262 of the storing section 23D in advance to manage which tray 11 is stored in which frontage. This information is transmitted to the tray carrier 2. Therefore, the rotation control section 214 (FIG. 2) of the tray carrier 2 can determine to which degree the pole 263 is rotated.

By adopting the configuration shown in FIG. 16, when the tray carrier 2C arrives at the work station P, the picking target tray 11 is directed to a direction in which the operator Op is present. Therefore, it is possible to improve efficiency of the picking work.

As shown in FIG. 16, the hooks 262 are provided in various directions in the circumferential direction of the pole 263. In this way, when the tray carrier 2C moves to the work station P, the pole 263 is rotated to allow the operator Op to easily pick a commodity in the tray 11.

According to the first embodiment, the tray carrier 2 takes out a plurality of trays 11 from the fixed shelf 6 and collectively conveys the trays 11 to the work station P according to an instruction of the controller 1. Consequently, in the work station P, the operator Op can take out a large number of the articles from the trays 11 conveyed in one conveyance. It is possible to improve picking efficiency of the operator Op.

With the article conveyance system Z according to the first embodiment, only the trays 11 necessary for the picking work can be conveyed. Therefore, unlike the technique described in Patent Literature 2, unnecessary trays 11 are not conveyed. Therefore, it is possible to reduce an overall movement distance of the tray carrier 2. It is possible to improve operation efficiency of the tray carrier 2. It is possible to reduce the number of tray carriers 2. It is also possible to reduce cost.

In the technique described in Patent Literature 1, it is difficult to change a layout, for example, change the positions of initially designed shelves and the number of stages of the shelves. On the other hand, the article conveyance system Z according to the first embodiment can easily change a layout, for example, change the positions of the initially designed fixed shelves 6 and the number of stages of the fixed shelves 6 simply by changing the data of the shelf data 152, the tray data 153, and the article data 154.

Further, with the article conveyance system Z according to the first embodiment, it is possible to convey only the trays 11 necessary for picking. Consequently, the article conveyance system Z can increase a picking amount available in one conveyance than the system that conveys a tray for each of shelves as in the technique described in Patent Literature 2. Therefore, the article conveyance system Z according to the first embodiment can improve work efficiency.

Second Embodiment (Tray Carrier)

Figure 17:
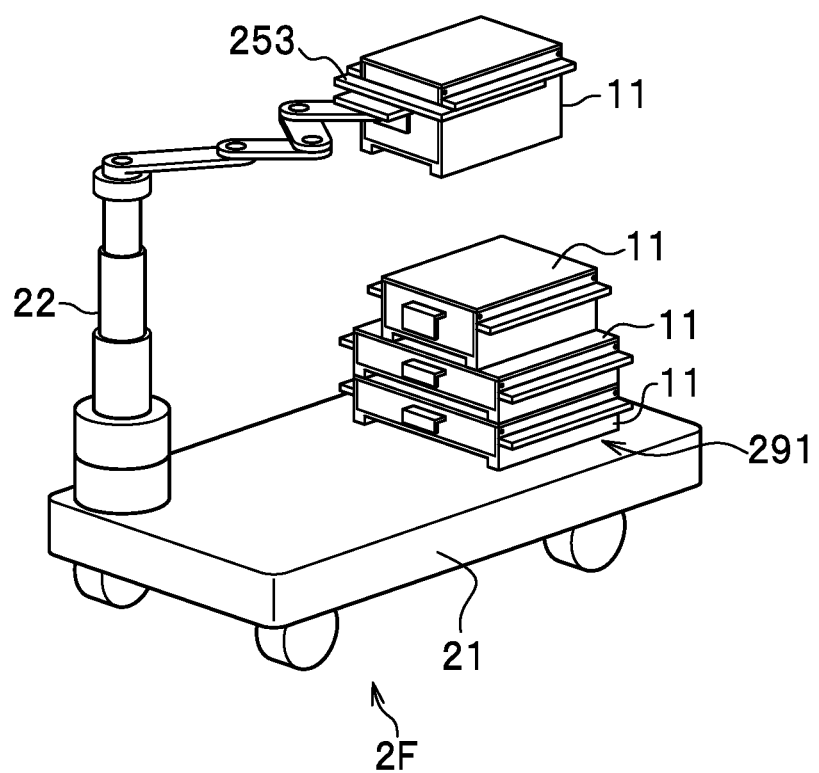
FIG. 17 is a diagram showing a configuration example of a tray carrier according to a second embodiment.

FIG. 17 is a diagram showing a configuration example of a tray carrier according to a second embodiment. Note that, in FIG. 17, the same components as the components shown in FIG. 3 are denoted by the same reference numerals and signs and explanation of the components is omitted.

In the second embodiment, lids are attached to the trays 11. The trays 11 can be stacked.

A tray carrier 2F does not include the storing section 23 shown in FIG. 3. Instead, the tray carrier 2F includes a stacking section 291 on which the trays 11 are stacked.

Note that the catcher section 253 in the take-out device 22 of the tray carrier 2F can change the width of a fork according to the width of the tray 11. However, illustration and specific explanation concerning a mechanism for changing the width of the fork are omitted.

A hardware configuration of the article conveyance system Z in the second embodiment is the same as the hardware configuration diagram shown in FIG. 2 except that the route generating section 115 performs processing explained below.

In the second embodiment, when a plurality of trays 11 retrieved by the tray retrieving section 113 are stacked, the route generating section 115 determines whether the height of the stacked trays 11 is equal to or smaller than a loadable height on the tray carrier 2. The route generating section 115 determines order in which the trays 11 can be stacked one another. The order is based on a predetermined rule, for example, a large tray 11 cannot be stacked on a small tray 11. The route generating section 115 determines stacking order of the tray 11. However, if a plurality of stacking patterns are present, the route generating section 115 enumerates all the stacking patterns. The route generating section 115 selects appropriate one pattern from the enumerated stacking patterns. Note that, if a plurality of trays 11 having the same size are included, any tray 11 may be placed on or under the tray 11 having the same size. Therefore, the route generating section 115 enumerates all kinds of stacking order. In this way, in the second embodiment, the route generating section 115 calculates take-out order of the trays 11 and generates a route such that the trays 11 are stacked.

Specific processing of the route generating section 115 is explained with reference to FIG. 18.

(Flowchart)

Figure 18:
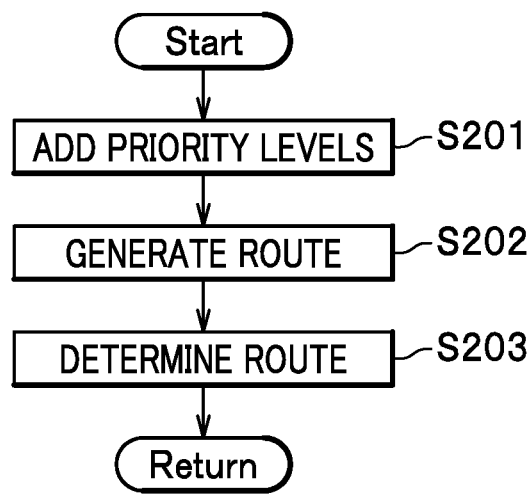
FIG. 18 is a flowchart showing a procedure of processing related to route generation of a picking system according to the second embodiment.

FIG. 18 is a flowchart showing a procedure of processing related to route generation of a picking system according to the second embodiment. Note that FIG. 18 is a diagram for explaining the processing in step S112 in FIG. 10 in detail. FIG. 2 and FIG. 7 to FIG. 9 are referred to as appropriate.

First, the route generating section 115 adds priority levels to the trays 11 set as picking targets (S201). At this time, the route generating section 115 sets a priority level of a large tray 11 high and sets a priority level of a small tray 11 low. Alternatively, the route generating section 115 sets a priority level of a heavy tray 11 high and sets a priority level of a light tray 11 low. An administrator or the like can determine which of a priority level of the size of the tray 11 or a priority level of the weight of the tray 11 is set higher. It is assumed that the priority level of the size of the tray 11 is set higher than the priority level of the weight of the tray 11. The route generating section 115 may set, as a priority level of the tray 11, a value obtained by multiplying together the priority level of the size of the tray 11 and the priority level of the weight of the tray 11.

The route generating section 115 generates a route based on the priority levels (S202). The route generating section 115 sets, as relay points, the fixed shelves 6 in which the trays 11 are stored (storing places of the trays 11). The route generating section 115 creates a route that makes rounds in order from the storage place of the tray 11 having a highest priority level.

At this time, the route generating section 115 refers to the tray data 153 and, every time the tray 11 is selected in descending order of the priority levels, cumulatively adds the height of the selected tray 11. When a result of the cumulative addition exceeds a predetermined threshold, the route generating section 115 sets the trays 11 up to the tray 11 selected before a currently selected tray 11 as stacking targets. In this way, the route generating section 115 can prevent over-stacking.

Note that, when the trays 11 having the same priority level are present, the route generating section 115 creates all routes as explained below. For example, when the trays 11 "A", "B", and "C" having the same priority level are present and the tray 11 "D" having a priority level lower than the priority level of the trays 11 "A" to "C" is present, the route generating section 115 generates six kinds of routes described below.

(1) A→B→C→D, (2) A→C→B→D, (3) B→C→A→D, (4) B→A→C→D, (5) C→A→B→D, (6) C→B→A→D

Thereafter, the route generating section 115 determines a route (S203). When a plurality of routes are generated like (1) to (6) described above, the route generating section 115 selects a route with the shortest distance to the work station P to determine a route. It is assumed that the trays 11 are stacked in the size order. However, a route can be generated by the same processing when the trays 11 are stacked in the weight order.

Figure 19:
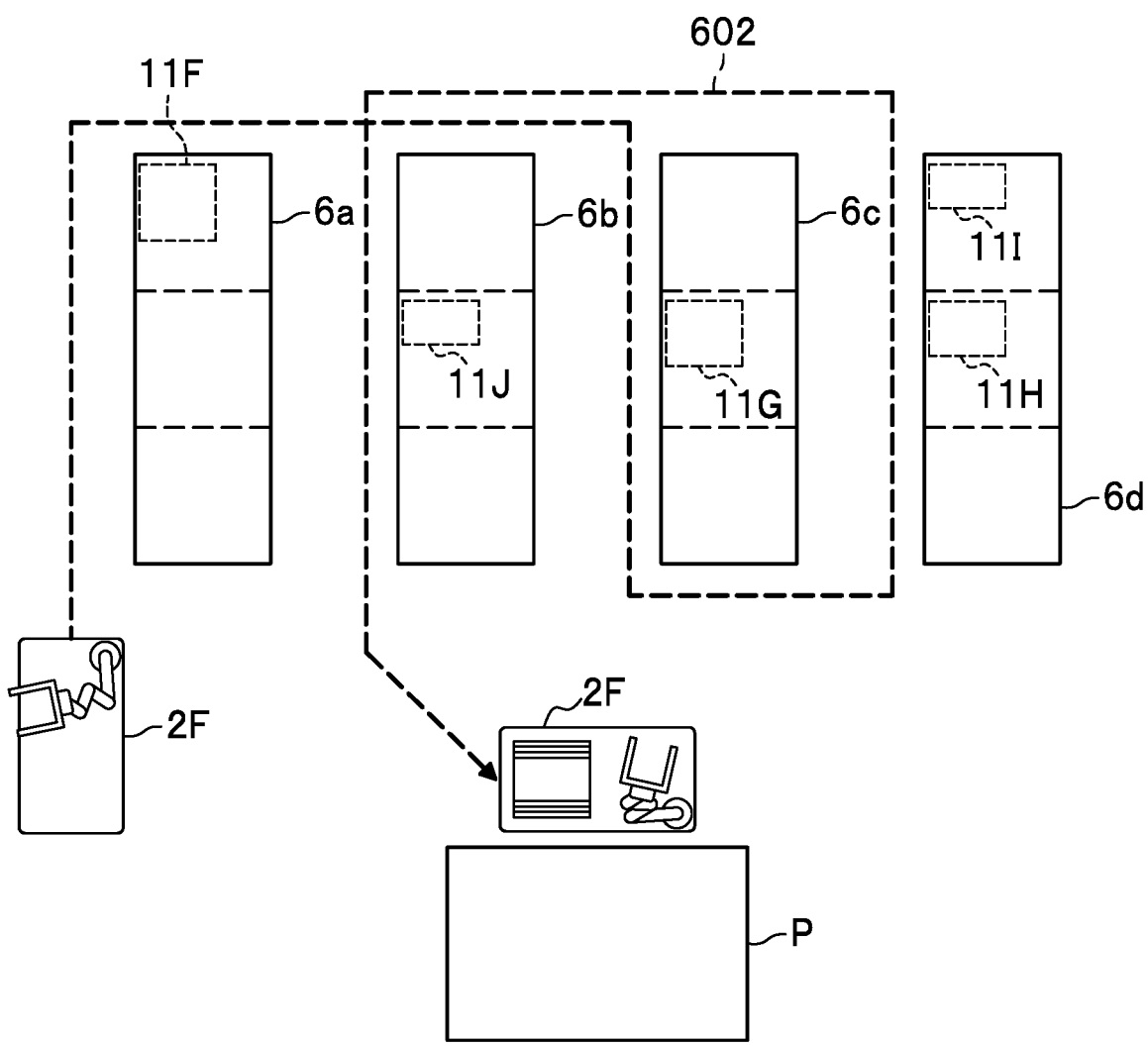
FIG. 19 is a diagram showing a round route generated by the route generation processing according to the second embodiment.

FIG. 19 is a diagram showing a round route generated by route generation processing according to the second embodiment.

A tray 11F having the largest size is stored in the fixed shelf 6a. A tray 11J having the smallest size is stored in the fixed shelf 6b. A tray 11G having the second largest size after the tray 11F is stored in the fixed shelf 6c. A tray 11I having the smallest size and a tray 11H having second smallest size after the tray 11I are stored in the fixed shelf 6d. That is, the order of the sizes of the trays 11 is the tray 11F>the tray 11G>the tray 11H>the tray 11I=the tray 11J.

The route generating section 115 refers to the fields of the longitudinal size, the lateral size, and the depth size of the tray data 153, compares the sizes of the trays 11F to 11J, and sets a route to take out the trays 11 in order from the tray 11F having the largest size. Subsequently, the route generating section 115 sets a route to take out the tray 11G having the second largest size after the tray 11F. The route generating section 115 sets a route to take out the tray 11H having the third largest size after the tray 11G. The sizes of the tray 11I and the tray 11J are the same. Therefore, the route generating section 115 generates both of a route of the tray 11I→the tray 11J and a route of the tray 11J→the tray 11I. The route generating section 115 sets, as the tray 11 to be taken out first, the tray 11I having the shortest distance of a route to the work station P. That is, the route generating section 115 selects a route of the tray 11I→the tray 11J.

As a result, a route 602 is generated by the route generating section 115.

Note that, in the second embodiment, the weight of the tray 11 is calculated from a tray weight stored in the tray data 153 and a total weight of articles calculated from the tray data 153 and the article data 154. However, the weight of the tray 11 is not limited to this. For example, weight detectors may be provided in the frontages of the fixed shelf 6. The weight of the tray 11 may be measured by the weight detectors.

When the trays 11 are stacked, it is difficult in terms of balance to set the tray 11 having large size on the tray 11 having small size. According to the second embodiment, it is possible to achieve efficiency of movement by determining order of taking out the trays 11 from the fixed shelf 6 according to the sizes of the trays 11 and further stacking the trays 11.

That is, the tray carrier 2F stacks the trays rather than storing the trays 11 in the storing section 23 shown in FIG. 3. Consequently, when the trays 11 are conveyed, it is necessary to stack the trays 11 not to fall apart during the conveyance. With the article conveyance system Z according to this embodiment, the trays 11 are stacked in descending order of sizes or descending order of weights. Therefore, it is possible to prevent the trays 11 from falling apart during the conveyance.

Third Embodiment

Figure 20:
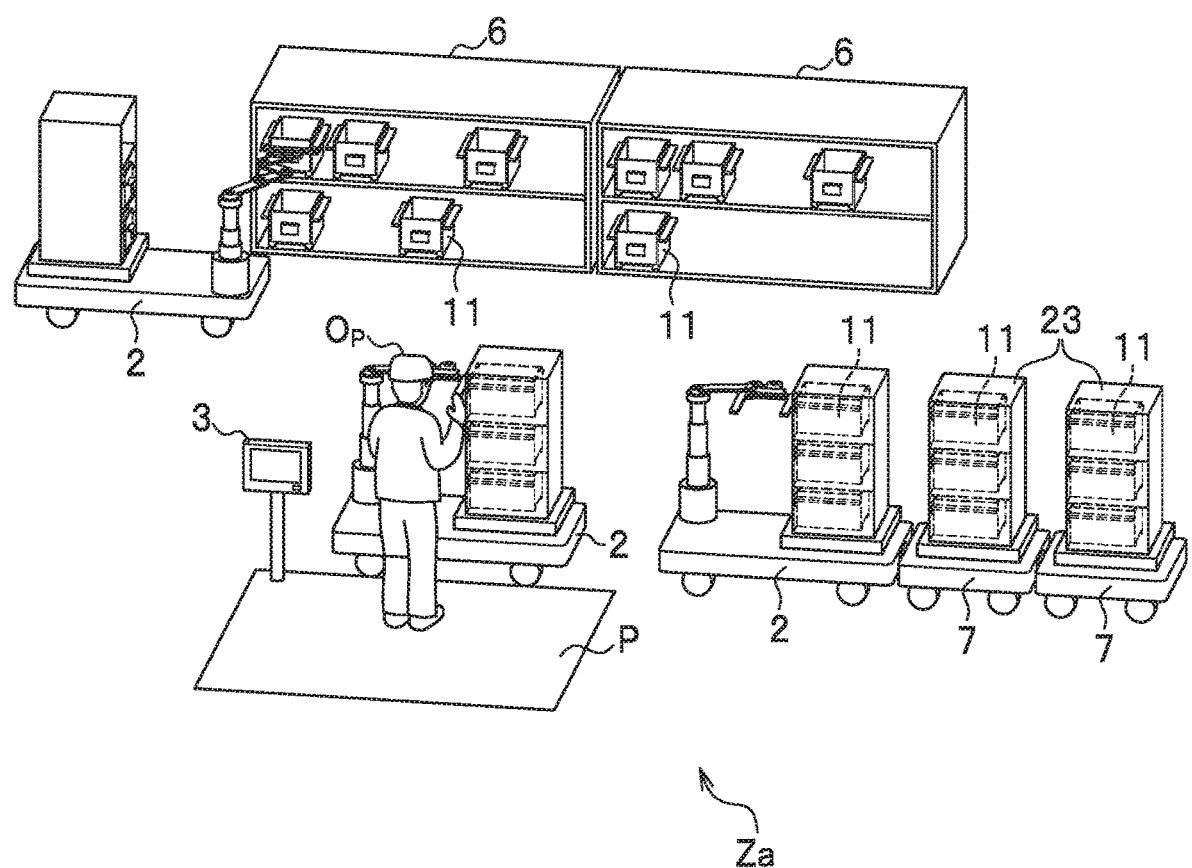
FIG. 20 is a diagram showing a schematic configuration of an article conveyance system according to a third embodiment.

FIG. 20 is a diagram showing a schematic configuration of an article conveyance system according to a third embodiment. In FIG. 20, the same components as the components shown in FIG. 1 are denoted by the same reference numerals and signs and explanation of the components is omitted.

In the third embodiment, an object is to improve work efficiency by using a conveyance unit 7 not including the take-out device 22.

In an article conveyance system Za, one or a plurality of conveyance units 7 are connected to the tray carrier 2. Note that the tray carrier 2 may independently move without the conveyance unit 7 being connected to the tray carrier 2. The conveyance unit 7 does not include the take-out device 22 and includes the storing section 23, in an upper part of which the tray 11 can be loaded. That is, the conveyance unit 7 has the same configuration as the tray carrier 2 except that the conveyance unit 7 does not include the take-out device 22. The conveyance unit 7 can be physically coupled to the tray carrier 2 by a not-shown coupler or the like. When the tray carrier 2 and the conveyance unit 7 are physically connected, the tray carrier 2 has power.

When taking out the trays 11 from the fixed shelf 6, the tray carrier 2 loads the trays 11 on the storing sections 23 of the conveyance units 7. A loading method is the same as the loading method in the first embodiment. That is, the tray carrier 2 loads the trays 11 on the conveyance units 7 and the tray carriers 2 using the take-out device 22.

In this way, according to the third embodiment, since the tray carriers 2 and the conveyance units 7 cooperate, it is possible to convey a larger number of trays 11 at a time than the article conveyance system Z according to the first embodiment.

The conveyance unit 7 may independently include a driving device and or may move following the tray carrier 2.

In this case, the conveyance unit 7 may be physically coupled to the tray carrier 2 or may not be coupled to the tray carrier 2.

According to the third embodiment, it is possible to further improve efficiency of work than the article conveyance system Z according to the first embodiment. That is, since a larger number of trays 11 can be conveyed at a time than the article conveyance system Z according to the first embodiment, it is possible to reduce a total waiting time of the operator Op. Consequently, the article conveyance system Za can further improve efficiency of work than the article conveyance system. Z according to the first embodiment.

Since it is unnecessary to set the take-out device 22 in the conveyance unit 7, it is possible to further reduce cost than when all the tray carriers 2 include the take-out devices 22.

Note that, since the trays 11 include the lids, when the trays 11 can be stacked, the conveyance unit 7 may have a configuration in which the take-out device 22 is excluded from the tray carrier 2F according to the second embodiment. In this case, the controller 1 is capable of stacking the trays 11 in size order and conveying the trays 11 by generating the same route as the route in the second embodiment and stacking the trays 11 in order on the tray carrier 2F and the conveyance unit 7.

For example, first, the route generating section 115 of the controller 1 generates a route to stack the tray 11 having a high priority level, for example, having large size on the conveyance unit 7 and the tray carrier 2F. Then, the route generating section 115 generates a route to stack the tray 11 having medium size on the conveyance unit 7 and the tray carrier 2F. Lastly, the route generating section 115 generates a route to stack the tray 11 having the smallest size on the conveyance unit 7 and the tray carrier 2F. The route generating section 115 refers to the tray data 153 and sets the height of the trays 11 stacked on the conveyance unit and the tray carrier 2F to be equal to or smaller than a predetermined height.

Fourth Embodiment

In a fourth embodiment, the carrier selecting section 114 determines the tray carrier 2 optimum for conveyance of the tray 11 among a plurality of tray carriers 2 present in a warehouse. Note that a hardware configuration of the article conveyance system Z in the fourth embodiment is the same as the hardware configuration shown in FIG. 2. Therefore, illustration and explanation of the hardware configuration are omitted.

(Flowchart)

Figure 21:
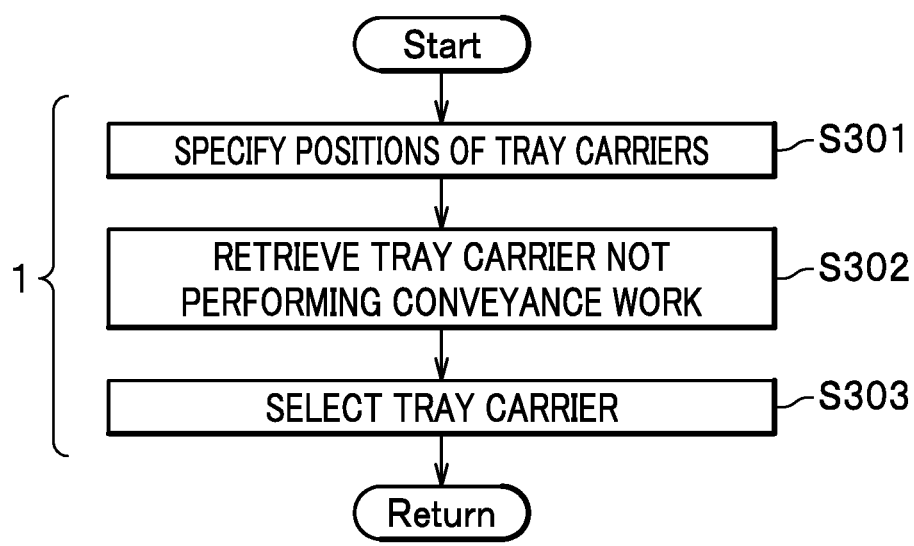
FIG. 21 is a flowchart showing a procedure of carrier selection processing of a controller according to a fourth embodiment.

FIG. 21 is a flowchart showing a procedure of carrier selection processing of a controller according to the fourth embodiment. Note that the processing shown in FIG. 21 is processing performed at timing of step S111 in FIG. 10. FIG. 2 is referred to as appropriate.

First, the carrier selecting section 114 specifies the positions of the tray carriers 2 present in the warehouse (S301). The specifying of the positions of the tray carriers 2 present in the warehouse is a publicly-known technique. Therefore, detailed explanation of the specifying of the positions is omitted.

Subsequently, the carrier selecting section 114 retrieves the tray carriers 2 not performing conveyance work among the tray carries 2 (S302). It is possible to easily determine, by setting a flag on the tray carrier 2 in conveyance, for example, a not-shown list of the tray carriers 2, whether the tray carrier 2 is performing the conveyance work.

The carrier selecting section 114 selects the tray carrier 2 that is conveying the tray 11 out of the tray carriers 2 retrieved in step S302 (S303). A processing section 110a returns the processing to step S112 in FIG. 10.

In step S303, when a plurality of tray carriers 2 not performing work are present, the carrier selecting section 114 selects, based on the positions of the tray carriers 2 specified in step S301, the tray carrier 2 closest to a position where the conveyance target tray 11 is stored. The carrier selecting section 114 may select the tray carrier 2 having the shortest total traveling distance of a round route among the tray carriers 2 not performing the conveyance work. In this case, the route generating section 115 generates a round route concerning each of the tray carriers 2 not performing the conveyance work.

Further, when all the tray carriers 2 are performing work, the carrier selecting section 114 may perform processing explained below. That is, the carrier selecting section 114 compares an end time of the work in the tray carrier 2 set as the processing target and a time when another tray carrier 2 travels to the position of the tray 11 set as a conveyance target. When determining that it is faster to allocate the next work after the end of the work of the tray carrier 2 set as the processing target than allocating work to the other tray carriers 2, the carrier selecting section 114 may select the tray carrier 2 performing the work. In this case, the carrier selecting section 114 estimates a work end time of the tray carrier 2 from the positions, the speeds, estimated work times input in advance, and the like of the tray carriers 2.

According to the fourth embodiment, when a plurality of tray carriers 2 are present, it is possible to allocate work to an appropriate tray carrier 2 from the positions and work states of the tray carriers 2.

According to the fourth embodiment, when a plurality of tray carries 2 not performing work are present, the carrier selecting section 114 selects the tray carrier 2 closest to a position where the target tray 11 is stored. Consequently, the carrier selecting section 114 can reduce a distance in which the tray carrier 2 moves to the storing position of the tray 11. Consequently, the article conveyance system Z can reduce a moving time of the tray carrier 2. The article conveyance system Z can reduce conveyance work deviation of the tray carrier 2.

Note that, when the tray carrier 2 set as the work target is determined by the carrier selecting section 114, the route generating section 115 creates conveyance order for taking out the trays 11 from the present position of the tray carrier 2 in view of the positions of the trays 11. This processing is the same processing as the processing in the first embodiment.

Fifth Embodiment

In a fifth embodiment, selection of a carrier and countermeasures taken when congestion of the tray carriers 2 occurs are explained.

(Hardware Configuration)

Figure 22:
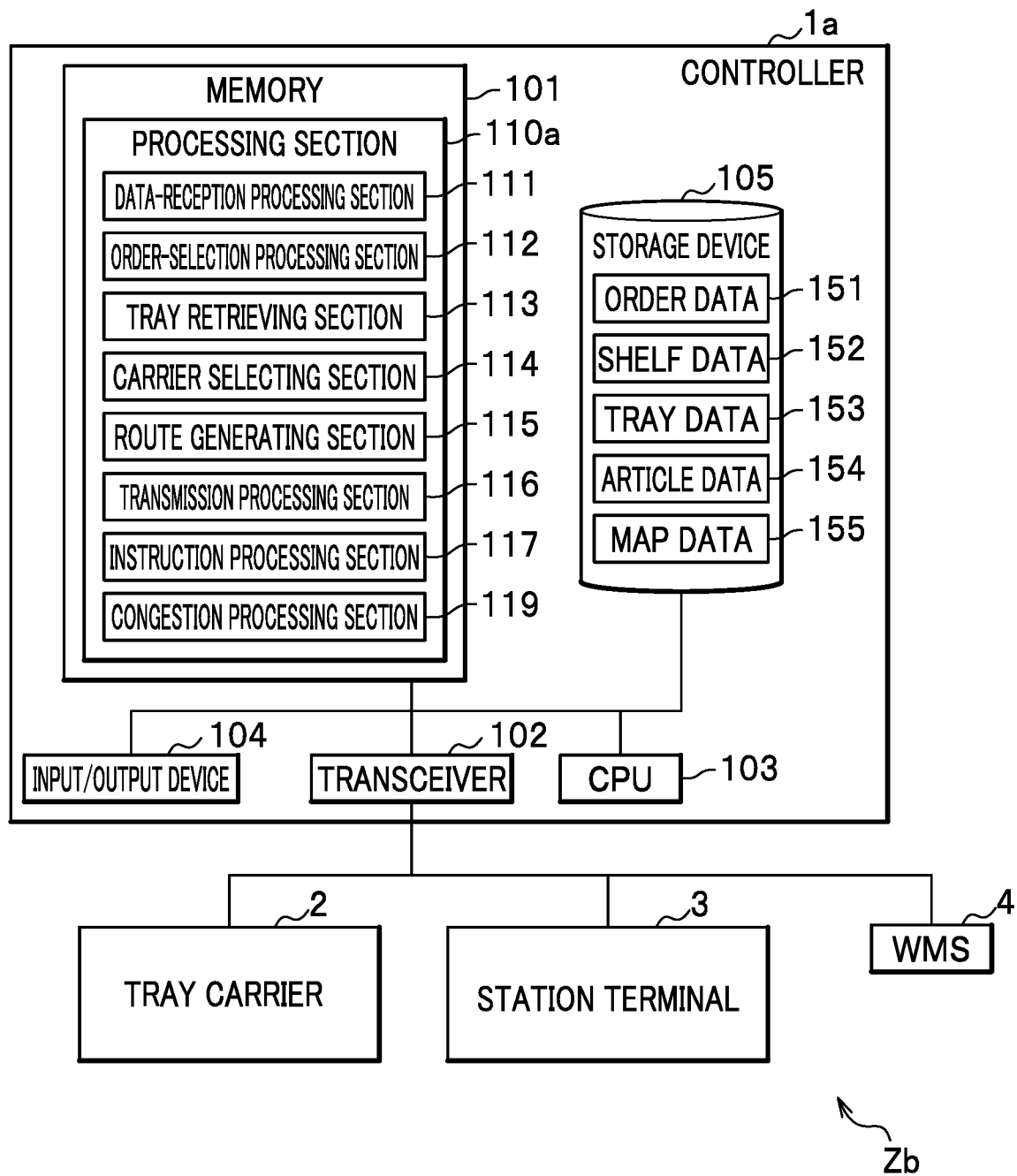
FIG. 22 is a diagram showing a hardware configuration example of an article conveyance system according to the fourth embodiment.

FIG. 22 is a diagram showing a hardware configuration example of an article conveyance system according to the fifth embodiment.

In an article conveyance system Zb according to the firth embodiment, the tray carrier 2 moves while reducing the influence of the other tray carriers 2 during conveyance.

In particular, countermeasures taken when congestion of the tray carriers 2 occurs are explained.

Note that, in FIG. 22, the same components as the components shown in FIG. 2 are denoted by the same reference numerals and signs and explanation of the components is omitted.

FIG. 22 is different from FIG. 2 in that the processing section 110a of a controller 1a includes a congestion processing section (a route changing section) 119.

The congestion processing section 119 determines whether congestion of the tray carriers 2 occurs in a warehouse. When congestion occurs, the congestion processing section 119 instructs the tray carrier 2 to change a route.

Note that the tray carrier 2 and the station terminal 3 are the same as those shown in FIG. 2. Therefore, illustration and explanation of detailed configurations of the tray carrier 2 and the station terminal 3 are omitted.

(Flowchart)

Figure 23:
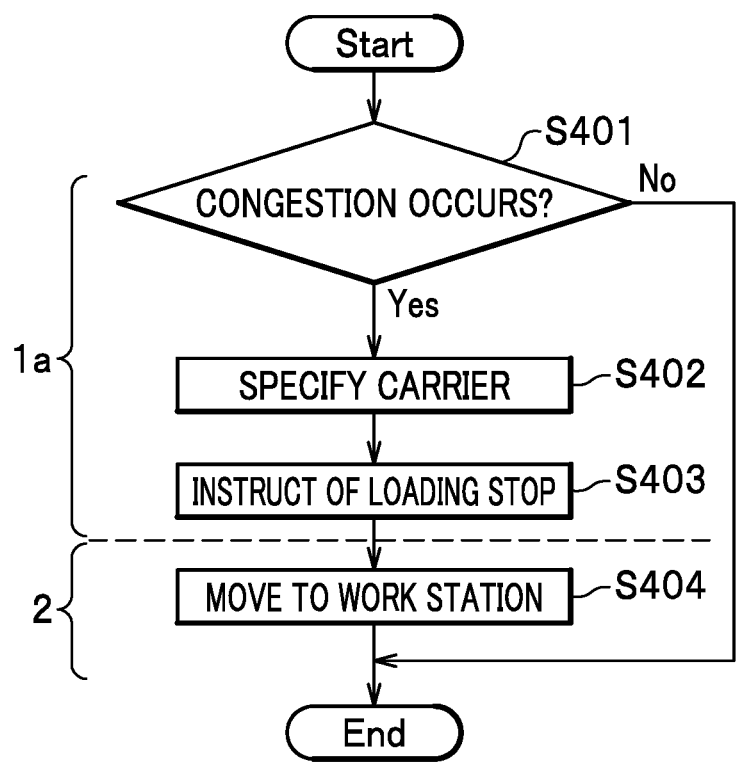
FIG. 23 is a flowchart showing a procedure of processing during congestion of the controller according to the fifth embodiment.

FIG. 23 is a flowchart showing a procedure of processing during congestion of a controller according to the fifth embodiment. The processing shown in FIG. 23 is processing performed at appropriate timing. FIG. 22 is referred to as appropriate.

First, the congestion processing section 119 determines whether congestion occurs (S401). When being notified from the controller 1a that reservation of a route is impossible or when the tray carrier 2 that is continuously in a state in which the speed of the tray carrier 2 is equal to or smaller than a threshold for a predetermined time is detected, the congestion processing section 119 determines that congestion occurs. Note that the tray carrier 2 reserves a route for each fixed section or fixed time among routes created by the route generating section 115. When the reservation is completed, the tray carrier 2 travels in the section. However, if the section to be reserved is occupied by the other tray carriers 2, the tray carrier 2 notifies the controller 1a that the reservation of the route is impossible.

As a result of step S401, when congestion does not occur (No in S401), the congestion processing section 119 of the controller 1a ends the processing.

As a result of step S401, when congestion occurs (Yes in S401), the congestion processing section 119 specifies the tray carrier 2 that cannot proceed because of the congestion (S402).

The congestion processing section 119 instructs the specified tray carrier 2 to stop loading (S403). The route generating section 115 instructs the tray carrier 2 to travel toward the work station P. Specifically, the route generating section 115 generates a route from the present position of the tray carrier 2 toward the work station P. The transmission processing section 116 transmits the generated route to the tray carrier 2. At this time, the congestion processing section 119 specifies, for example, from the position of the tray carrier 2 and the route generated first, which tray 11 the tray carrier 2 is currently taking out. Further, the congestion processing section 119 transmits the remaining tray IDs to the WMS 4. The WMS 4 generates the order data 151 anew based on the transmitted tray IDs.

In this way, even if the tray 11 for which work is scheduled but the work cannot be completed because of the influence of the other tray carriers 2 is present, the work can be carried forward to the next conveyance.

The movement control section 211 of the tray carrier 2 moves the tray carrier 2 to the work station P (S404).

In this way, in the fifth embodiment, when it is determined that congestion of the tray carries 2 occurs, the route of the tray carrier 2 is changed. In this way, it is possible to reduce the congestion. Further, in the fifth embodiment, take-out work of the trays 11 is stopped to cause the tray carrier 2 to travel toward the work station P.

In this way, even if congestion of the tray carriers 2 occurs, it is possible to convey the loaded trays 11 to the work station P at once. Therefore, it is possible to achieve a reduction in time.

That is, even if there is interference by the other tray carriers 2, it is possible to carry out efficient conveyance by changing a conveyance route and conveyance work according to a situation.

Note that, when a plurality of tray carriers 2 are operating in the same region, the controller 1a may change an instructed route from the positions and work states of the other tray carries 2 and change the route to a route on which the tray carrier 2 can move in the shortest time at that point in time.

In the fifth embodiment, congestion is detected according to whether reservation of a route is impossible. However, detection of congestion is not limited to this. For example, when the tray carriers 2 notify positions of the tray carriers 2 one another and a predetermined number or more tray carriers 2 are present in a predetermined range, the processing section of the tray carrier 2 may determine that congestion occurs. Alternatively, as explained above, when the speed of the tray carrier 2 decreases to predetermined speed or less, the congestion processing section 119 may determine that congestion occurs.

The controller 1a may predict movements and work states of the other tray carriers 2 at a point in time of route determination. When congestion or a wait occurs because of the presence of the other tray carriers 2, the controller 1a may determine a route to bypass the other tray carriers 2.

Sixth Embodiment

Figure 24:
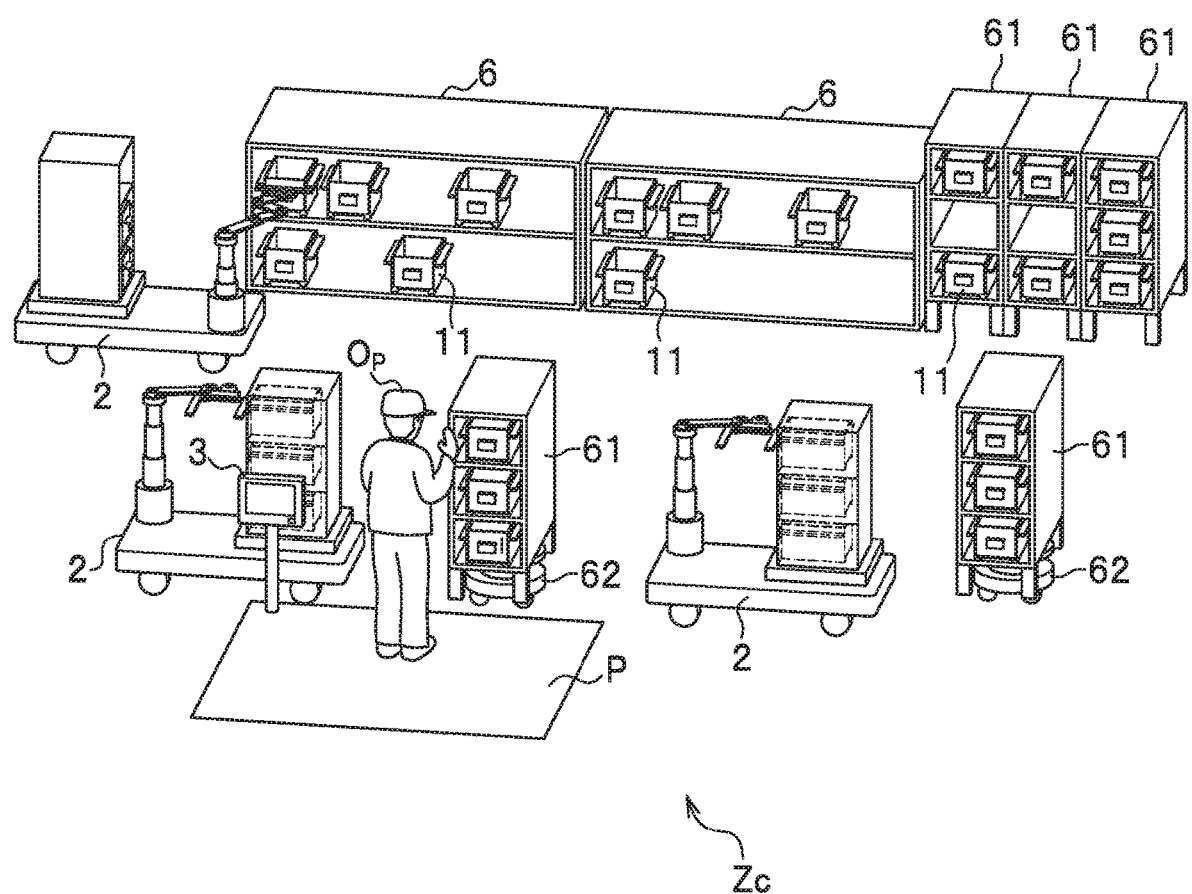
FIG. 24 is a diagram showing a schematic configuration of an article conveyance system according to a sixth embodiment.

FIG. 24 is a diagram showing a schematic configuration of an article conveyance system according to a sixth embodiment. In FIG. 24, the same components as the components shown in FIG. 1 are denoted by the same reference numerals and signs and explanation of the components is omitted.

In FIG. 24, the fixed shelves 6 and movable shelves 61 are mixed.

In an article conveyance system Zc, the trays 11 stored in the fixed shelves 6 are conveyed by the tray carrier 2. A conveyance method is the method according to the first to fifth embodiments.

The movable shelf 61 stores the trays 61 or articles. The movable shelf 61 is conveyed by a shelf carrier (a shelf conveyance device) 62.

The movable shelf 61 includes a space enough for the shelf carrier 62 to enter below the floor. The shelf carrier 62 enters under the movable shelf 61 and lifts and conveys the movable shelf 61.

The conveyance of the movable shelf 61 by the shelf carrier is a publicly-known technique. Therefore, explanation is omitted concerning detailed processing of the shelf carrier 62.

Note that the trays 11 or articles are stored in the movable shelf 61.

When the movable shelf 61 is once lifted by the shelf carrier 62, it is possible to convey a plurality of kinds of articles. Therefore, for example, frequently used articles are mainly stored in the movable shelf 61. On the other hand, for example, it is possible to store not-frequently used articles in the fixed shelf 6 and convey only necessary trays 11. In this way, according to the sixth embodiment, it is possible to flexibly store articles, for example, change a storage destination of articles according to a frequency of use. Note that a storage destination may be selected based on not only the frequency of use but also other standards.
(Hardware Configuration Diagram)

Figure 25:
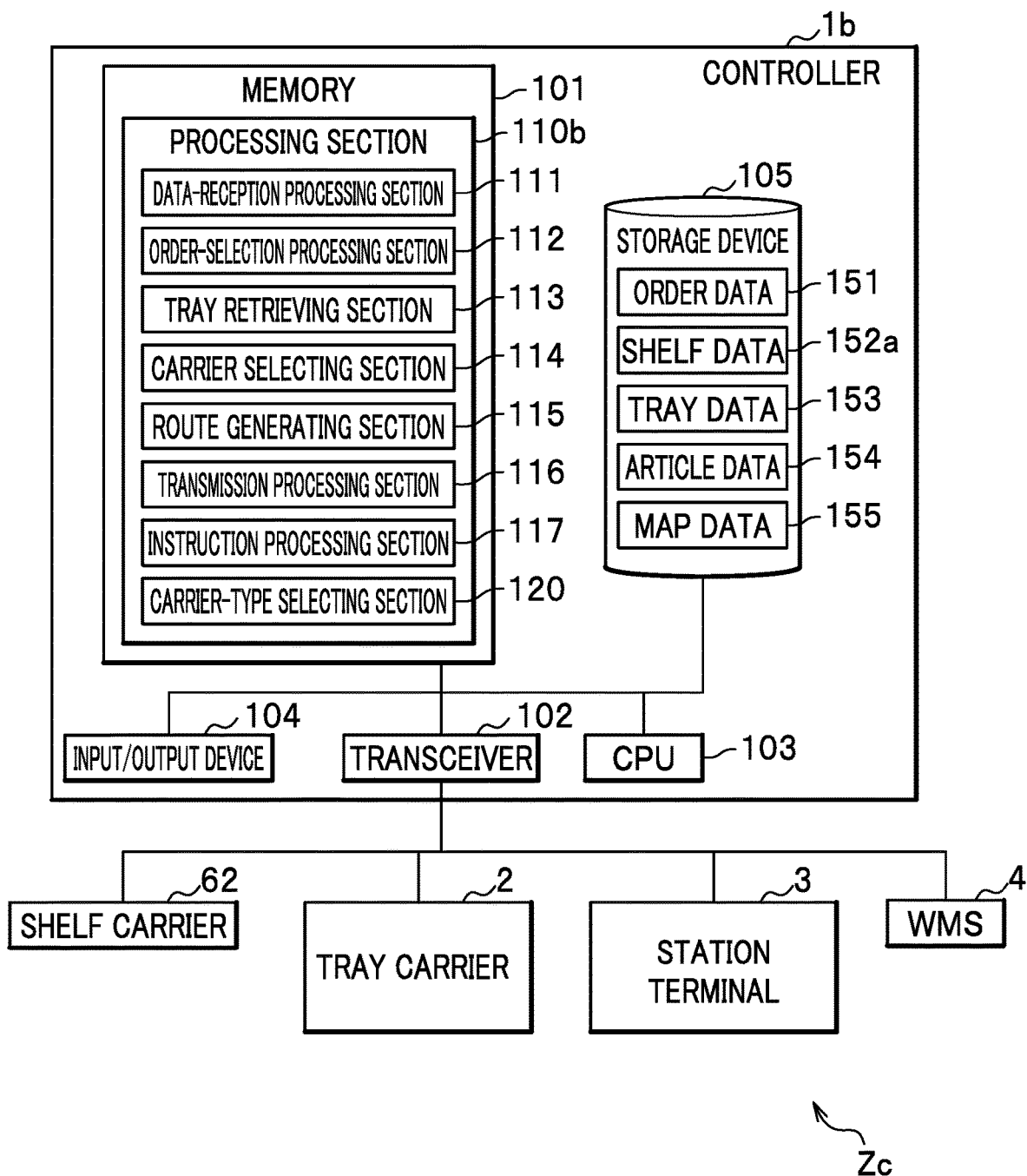
FIG. 25 is a diagram showing a hardware configuration example of the article conveyance system according to the sixth embodiment.

FIG. 25 is a diagram showing a hardware configuration example of the article conveyance system according to the sixth embodiment.

In FIG. 25, the same components as the components shown in FIG. 2 are denoted by the same reference numerals and signs and explanation of the components is omitted.

FIG. 25 is different from FIG. 2 in that the article conveyance system Zc includes the shelf carrier 62. Further, FIG. 25 is different from FIG. 2 in that a processing section 110b of a controller 1b includes a carrier-type selecting section (a conveyance-device-type selecting section) 120. Further, FIG. 25 is different from FIG. 2 in that the storage device 105 of the controller 1b includes shelf data 152a.

The carrier-type selecting section 120 selects a type of a carrier (the tray carrier 2 or the shelf carrier 62) according to a type of a shelf set as a picking target.

The shelf data 152a is explained below.

Note that the tray carrier 2 and the station terminal 3 are the same as those shown in FIG. 2. Therefore, illustration and explanation are omitted concerning detailed configurations of the tray carrier 2 and the station terminal 3.

The shelf carrier 62 is a publicly-known technique. Therefore, illustration and explanation are omitted concerning a detailed configuration of the shelf carrier 62.
(Shelf Data)

Figures 26, 27:
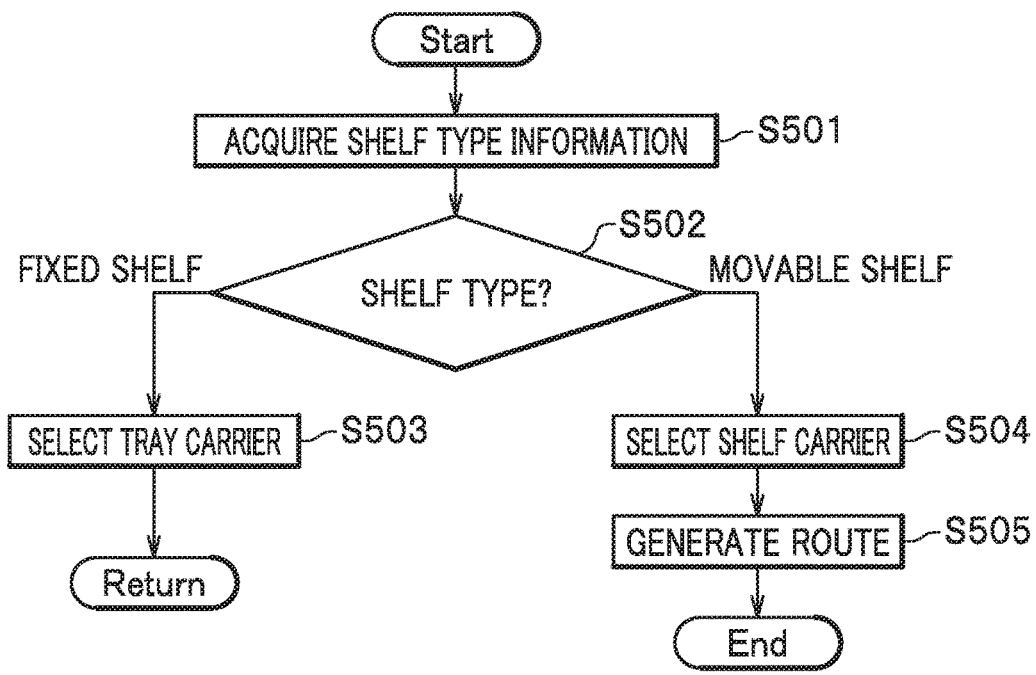
FIG. 26 is a diagram showing an example of shelf data according to the sixth embodiment.
FIG. 27 is a flowchart showing a procedure of processing in a picking system according to the sixth embodiment.

FIG. 26 is a diagram showing an example of shelf data according to the sixth embodiment.

The shelf data 152a shown in FIG. 26 is different from the shelf data 152 shown in FIG. 7 in that the shelf data 152a includes a field of a shelf type.

In the shelf type, a type of a shelf corresponding to the shelf type ("fixed" indicating the fixed shelf 6 or "movable" indicating the movable shelf 61) is stored.
(Flowchart)

FIG. 27 is a flowchart showing a procedure of processing in a picking system according to the sixth embodiment. FIG. 27 is the processing performed in step S111 in FIG. 10. FIG. 25 and FIG. 26 are referred to as appropriate.

First, the carrier-type selecting section 120 acquires shelf type information referring to the shelf data 152a (S501).

Specifically, the carrier-type selecting section 120 refers to the field of the shelf type of the shelf data 152a using the tray ID acquired at the stage of step S104 in FIG. 10 as a key to acquire shelf type information.

Subsequently, the carrier-type selecting section 120 determines whether the shelf type is the fixed shelf 6 or the movable shelf 61 (S502).

As a result of step S502, when the shelf type is the fixed shelf 6 (fixed shelf in S502), the carrier-type selecting section 120 selects the tray carrier 2 as a carrier (S503) and returns to the processing in step S112 in FIG. 10.

As a result of step S502, when the shelf type is the movable shelf 61 (movable shelf in S502), the carrier-type selecting section 120 selects the shelf carrier 62 (S504). The route generating section 115 generate a route to be transmitted to the shelf carrier 62 (S505). The route of the shelf carrier 62 is a publicly-known technique. Therefore, explanation of the route of the shelf carrier 62 is omitted.

Note that, in the sixth embodiment, the processing concerning the tray carrier 2 is the same as the processing explained in the first to fifth embodiments. The processing concerning the shelf carrier 62 is a publicly-known technique. Therefore, specific explanation of the processing concerning the tray carrier 2 and the processing concerning the shelf carrier 62 is omitted.

The article conveyance system Zc according to the sixth embodiment properly uses the shelves (the fixed shelf 6 and the movable shelf 61) and the carriers (the tray carrier 2 and the shelf carrier 62) according to a state such as a frequency of use of articles. Consequently, it is possible to improve efficiency of conveyance to a picking station. It is possible to improve picking efficiency.

Seventh Embodiment

Before explanation of a seventh embodiment, a problem and an object of an article conveyance system Zd according to the sixth embodiment are explained. As the normal fixed shelf 6 or movable shelf 61, the fixed shelf 6 or the movable shelf 61 having a reachable height of the operator Op is used. Therefore, a useless space is formed above the fixed shelf 6 or the movable shelf 61. When the movable shelf 61 moved by the shelf carrier 62 explained in the sixth embodiment is used, the weight and the height of the movable shelf 61 that can be lifted by the shelf carrier 62 are limited. Therefore, a useless space is also formed above the movable shelf 61.

In the seventh embodiment, an object is to make it possible to effectively use a space above a shelf while improving efficiency of picking work.
(Schematic Configuration of a System)

Figure 28:
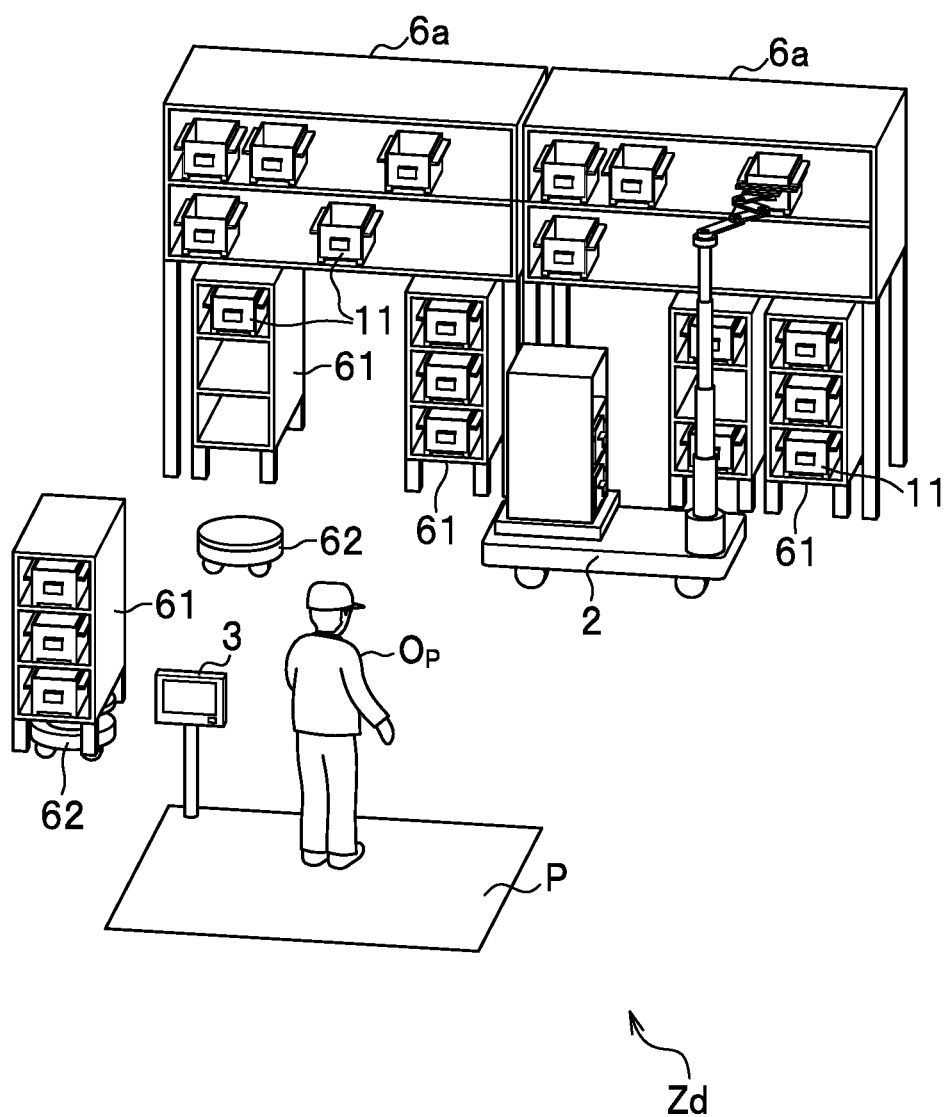
FIG. 28 is a diagram showing a schematic configuration of an article conveyance system according to a seventh embodiment.

FIG. 28 is a diagram showing a schematic configuration of the article conveyance system according to the seventh embodiment. Note that, in FIG. 28, the same components as the components shown in FIG. 1 are denoted by the same reference numerals and signs and explanation of the components is omitted.

In the article conveyance system Zd, the fixed shelf 6a includes a space in a lower part. The trays 11 in which articles are stored are stored or articles are directly stored in shelf stages of the fixed shelf 6a. The tray carrier 2 in the article conveyance system Zd takes out, with the take-out device 22 of the tray carrier 2 having the same configuration as the configuration in the first to fourth embodiments, the trays 11 stored in the fixed shelf 6a.

The movable shelf 61 is a shelf having a fixed height. As in the sixth embodiment, the movable shelf 61 includes, in a lower part, a space that allows the shelf carrier 62 to enter. As in the sixth embodiment, the shelf carrier 62 enters the lower space of the movable shelf 61 and lifts and conveys the movable shelf 61, so that the movable shelf 61 is conveyed.

The movable shelf 61 is set in the lower space of the fixed shelf 6a.

In this way, by locating the fixed shelf 6a and the movable shelf 61 in the up-down direction, it is possible to utilize an upper space of a warehouse (a space above the movable shelf 61). It is possible to improve storage efficiency in the warehouse.

When the tray carrier 2 takes time for take-out work of the fixed shelf 6a located in an upper part, not-frequently used articles are stored in the fixed shelf 6a. Consequently, it is possible to reduce the number of times of time-consuming access to the fixed shelf 6a in the upper part. It is possible improve efficiency of entire picking work.

Note that, in the seventh embodiment, processing concerning the tray carrier 2 is the same as the processing explained in the first embodiment. Processing concerning the shelf carrier 62 is a publicly-known technique. Therefore, specific explanation of the processing is omitted.

Eighth Embodiment

Figure 29:
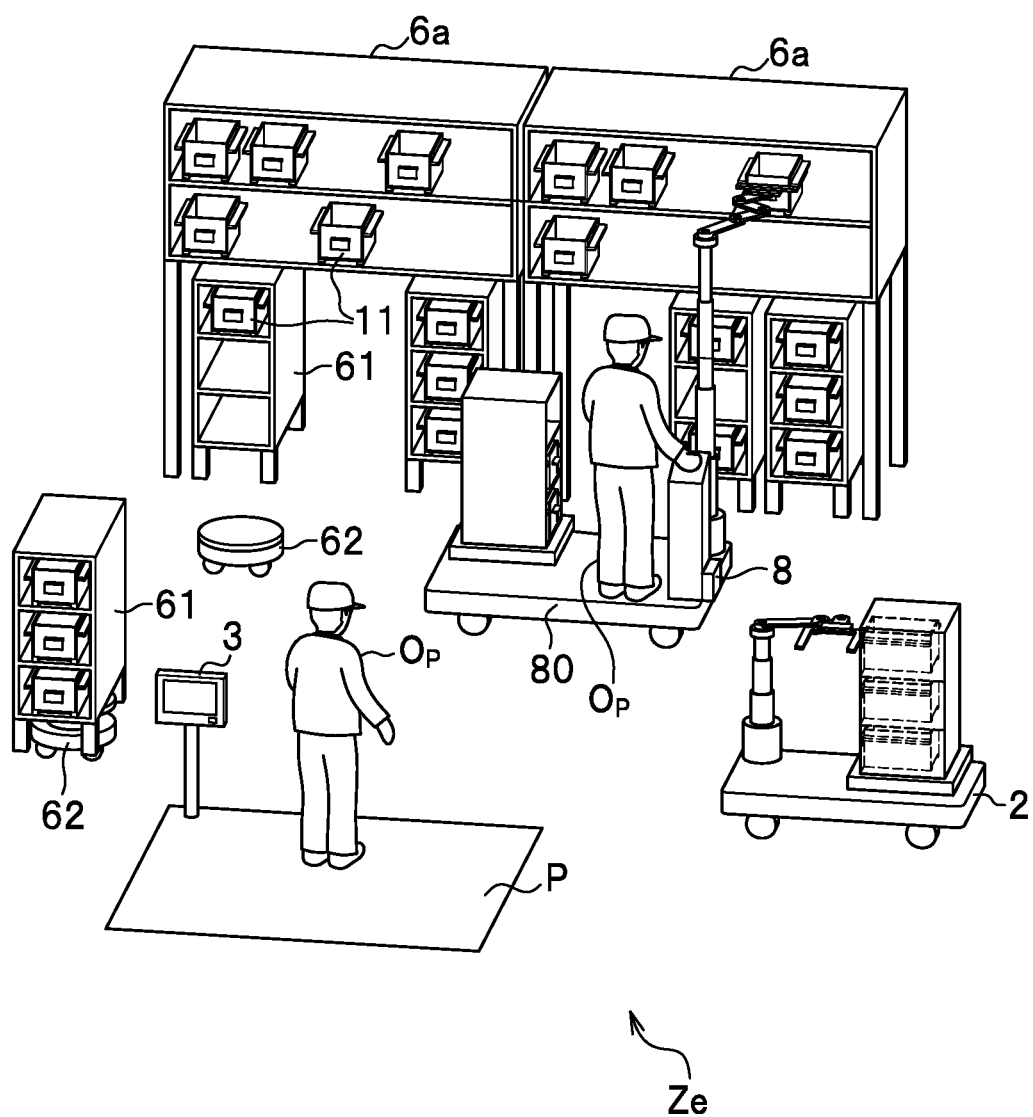
FIG. 29 is a diagram showing a schematic configuration example of an article conveyance system according to an eighth embodiment.

In the eighth embodiment, a machine operated by a person and autonomous devices such as the tray carrier 2 and the shelf carrier 62 are mixed.
(Schematic Configuration of a System)
FIG. 29 is a diagram showing a schematic configuration example of an article conveyance system according to the eighth embodiment. Note that, in FIG. 29, the same components as the components shown in FIG. 28 are denoted by the same reference numerals and signs and explanation of the components is omitted. In an article conveyance system Ze shown in FIG. 29, the fixed shelf 6a and the movable shelf 61 has the same configurations as the configurations in the seventh embodiment.

That is, as in the seventh embodiment, the movable shelf 61 is set in the lower space of the fixed shelf 6a. Articles in the fixed shelf 6a are taken out by the tray carrier 2 or a forklift (a non-autonomous moving device) 80 operated by the operator Op. The operator Op drives the forklift 80 and takes out and stores articles according to an instruction of an administrator or a controller 1d (FIG. 30).

In the eighth embodiment, to allow the forklift 80 operated by the person and the tray carrier 2 and the shelf carrier 62 to move without colliding, the position of the forklift 80 is notified to the controller 1d.

A detachable attachment device (a position notifying device) attachable as an accessory and capable of acquiring and transmitting the position of the forklift 80 is attached to the forklift 80.
(Hardware Configuration Diagram)
FIG. 30 is a hardware configuration example of the article conveyance system according to the eighth embodiment.

Figure 30:
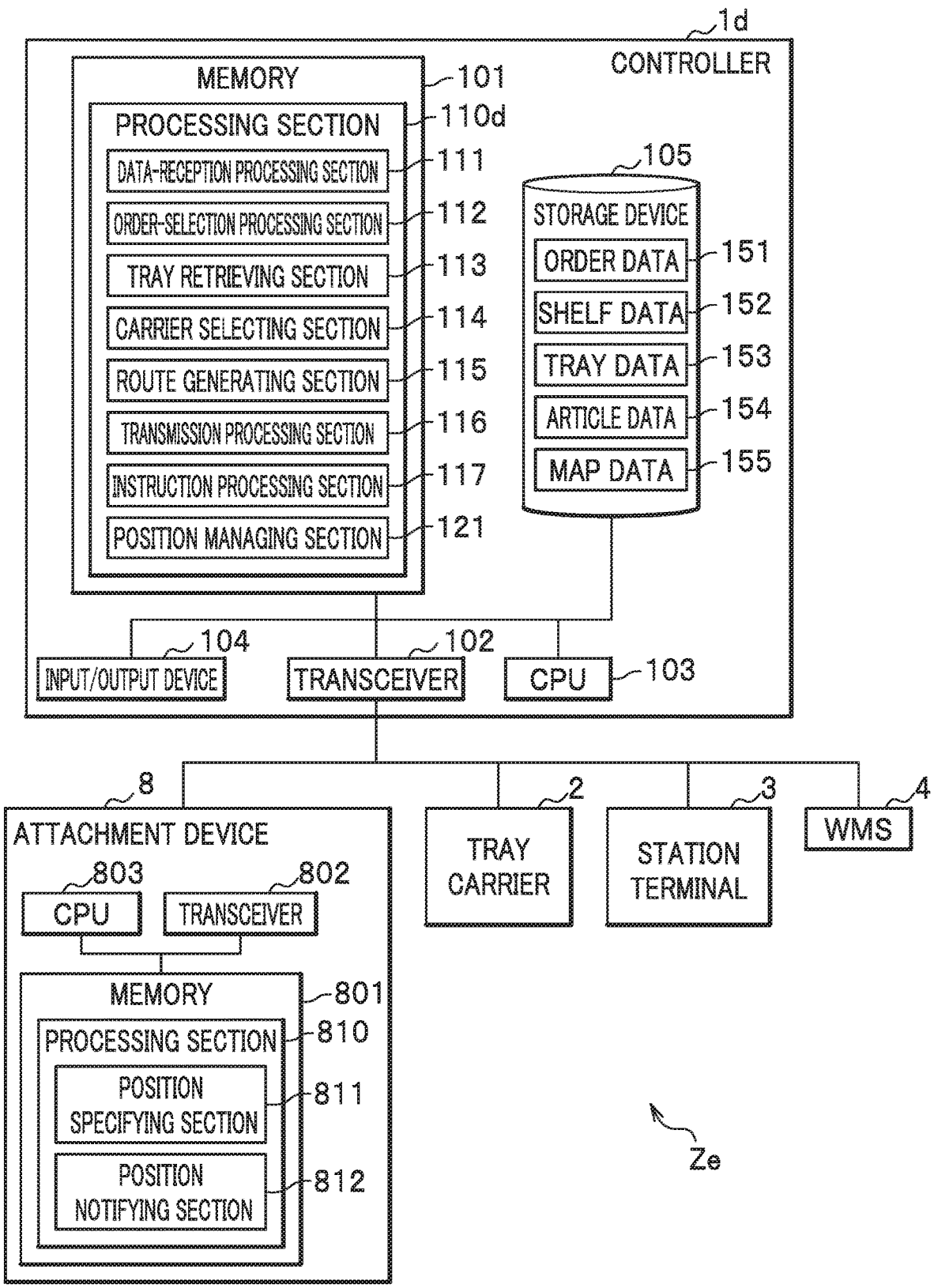
FIG. 30 is a diagram showing a hardware configuration example of the article conveyance system according to the eighth embodiment.

The article conveyance system Ze shown in FIG. 30 is different from the article conveyance system Z shown in FIG. 2 in that the article conveyance system Ze includes the attachment device 8 set in the forklift 80 (FIG. 29) in addition to the components shown in FIG. 1.

The attachment device 8 includes a memory 801, a transceiver 802, and a CPU 803. The memory 801, the transceiver 802, and the CPU 803 are connected to one another via a bus.

The CPU 803 executes various kinds of arithmetic processing.

The memory 801 is a volatile transitory storage medium. In the memory 801, various programs are executed by the CPU 803 and various data are read and written. As a result, in the memory 801, a processing section 810 and a position specifying section 811 and a position notifying section 812 configuring the processing section 810 are embodied.

The position specifying section 811 estimates a position of the attachment device 8 in a warehouse. As the estimation of the position, a not-shown camera incorporated in the attachment device 8 reads a marker stuck to a floor surface or the like to thereby acquire the position of the attachment device 8. Alternatively, the position of the attachment device 8 may be estimated by collation of shape recognition of the periphery by a not-shown laser scanner incorporated in the attachment device 8 and a map. Alternatively, the position of the attachment device 8 may be estimated by transmission information of a beacon or the like set in the warehouse. Note that an estimation method for the position of the attachment device 8 is not limited to these methods.

The position notifying section 812 notifies the controller 1d of the position of the attachment device 8 (the position of the forklift 80) estimated by the position specifying section 811.

The controller 1d is different from the controller 1 shown in FIG. 2 in that a processing section 110d includes a position managing section (a prohibition-region setting section) 121.

Figure 31:
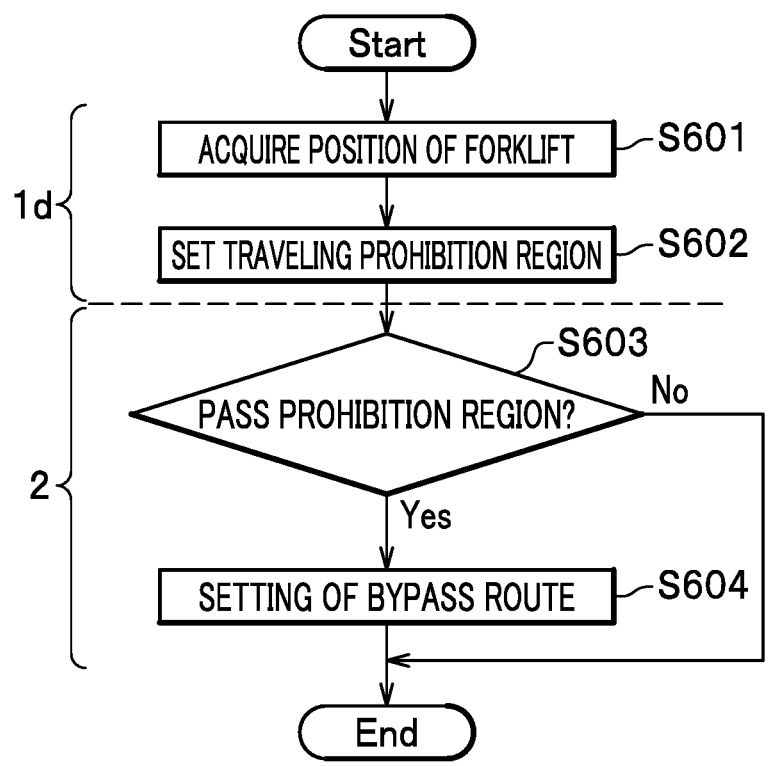
FIG. 31 is a flowchart showing a procedure of processing in an article management system according to the eighth embodiment.

The position managing section 121 manages, based on the map data 155, the position of the forklift 80 (the position of the attachment device 8) received from the attachment device 8. The position managing section 121 sets the tray carrier 2 not to travel on a link of a map on which the forklift 80 is located. That is, the position managing section 121 sets a predetermined range around the forklift 80 as a traveling prohibition region of the tray carrier 2.
(Flowchart)
FIG. 31 is a flowchart showing a procedure of processing in an article management system according to the eighth embodiment. Note that the processing shown in FIG. 31 is processing performed at a predetermined interval in a picking system. FIG. 30 is referred to as appropriate.

The position managing section 121 acquires the position of the forklift 80 from the position notifying section 812 attached to the forklift 80 (S601).

Subsequently, the position managing section 121 sets a traveling prohibition region of the tray carrier 2 and the shelf carrier 62 based on the acquired position of the forklift 80 (S602).

The position managing section 121 notifies the traveling prohibition region to the tray carrier 2 and the shelf carrier 62 via the transmission processing section 116.

Processing in the tray carrier 2 is explained below. The same processing is performed in the shelf carrier 62.

The movement control section 211 of the tray carrier 2 determines whether a route about to be reserved passes the traveling prohibition region (a prohibition region) (S603).

As a result of step S603, when the route about to be reserved does not pass the traveling prohibition region (the prohibition region) (No in S603), the movement control section 211 of the tray carrier 2 ends the processing.

As a result of step S603, when the route about to be reserved passes the traveling prohibition region (the prohibition region) (Yes in S603), the movement control section 211 of the tray carrier 2 sets a bypass route (S604).

Note that, in this embodiment, the tray carrier 2 sets the bypass route. However, the bypass route may be set otherwise. For example, the movement control section 211 of the tray carrier 2, which detects that the route about to be reserved passes the traveling prohibition region, transmits indication that the route passes the traveling prohibition region and the position of the tray carrier 2 to the controller 1d. The route generating section 115 of the controller 1d may generate the bypass route.

Figure 32:
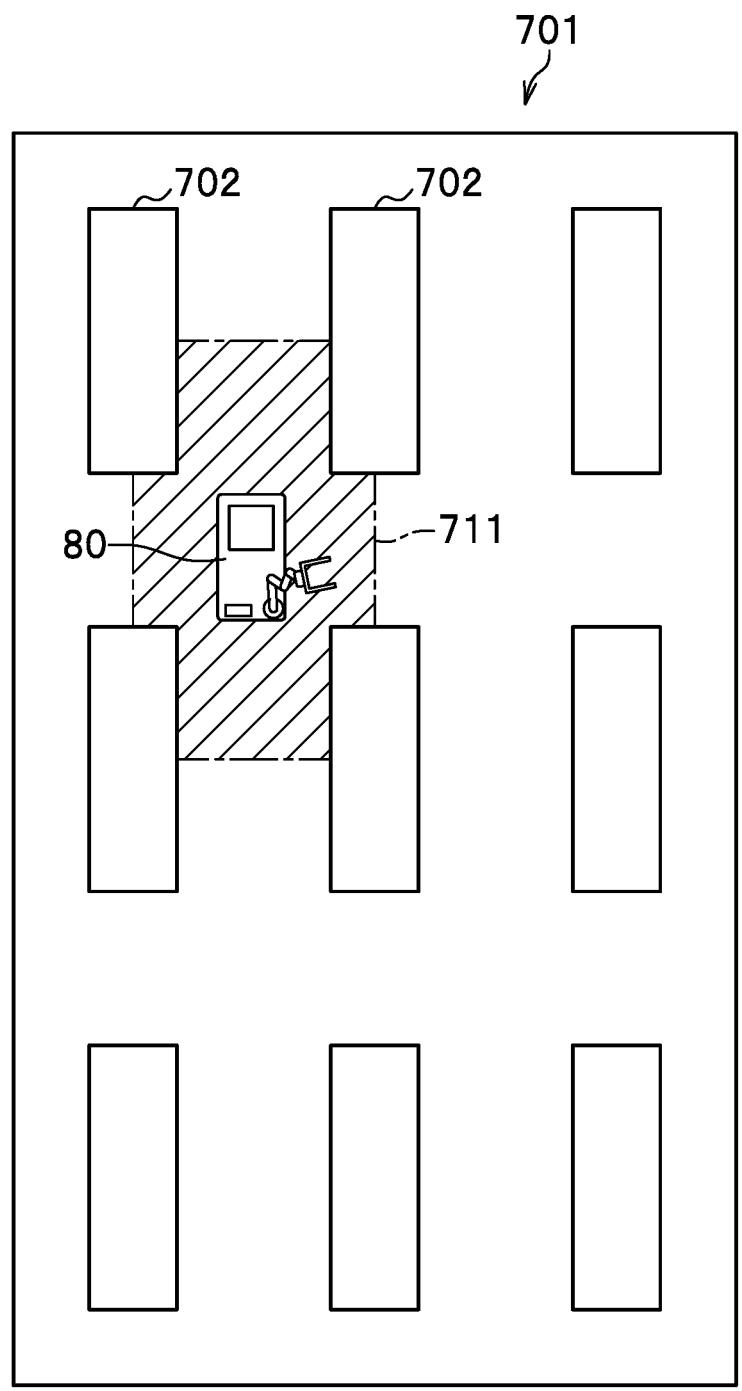
FIG. 32 is a diagram showing an example of a traveling prohibition region according to the eighth embodiment.

FIG. 32 is a diagram showing an example of the traveling prohibition region according to the eighth embodiment.

Shelves 702 are set on the inside of a warehouse 701. The shelves 702 are the fixed shelf 6a and the movable shelf 61 (FIG. 29). When the forklift 80 is present in a position shown in FIG. 32, a region around a predetermined range from the position is a traveling prohibition region 711.

The article conveyance system Ze according to the eighth embodiment is applied when a device operated by a person such as the forklift 80 and devices that autonomously move such as the tray carrier 2 and the shelf carrier 62 are mixed. The detachable attachment device 8 is used in order to notify the position of the forklift 80 to the tray carrier 2 and the shelf carrier 62. Consequently, it is possible to use a general-purpose forklift 80 without introducing a new forklift 80. Consequently, it is possible to achieve improvement of convenience and reduce cost.

Since the periphery of the position of the forklift 80 is set as the traveling prohibition region, it is possible to control the tray carrier 2 and the shelf carrier 62 to prevent collision of the forklift 80 and the tray carrier 2 and the shelf carrier 62. Consequently, it is possible to improve safety.

When the position notifying section 812 sequentially notifies the position of the forklift 80, it is possible to perform determination of traveling and a stop of the forklift 80 on the controller 1*d* side from temporal fluctuation of the notified position of the forklift 80. The position managing section 121 of the controller 1*d* may update and set, as appropriate, from information concerning such traveling and stop states of the forklift 80, a region where the traveling of the tray carrier 2 is limited. For example, during the stop of the forklift 80, the position managing section 121 may allow the tray carrier 2 and the shelf carrier 62 to travel even in the traveling prohibition region defined by the map data 155 where the forklift 80 is present. However, if the forklift 80 is traveling, for example, the position managing section 121 may set a predetermined link in a traveling direction as the traveling prohibition region.

Note that, in the eighth embodiment, the forklift 80 is explained as an example of the machine operated by the person. However, the machine operated by the person is not limited to this.

In the eighth embodiment, the attachment device 8 performs communication with the controller 1. However, communication may be performed between the attachment device 8 and the tray carrier 2 and the shelf carrier 62.

In the embodiments, the tray carrier 2 takes out the trays 11 from the fixed shelf 6. However, not only this, but the tray carrier 2 may take out the trays 11 from the movable shelf 61.

The present invention is not limited to the embodiments explained above. Various modifications are included in the present invention. For example, the embodiments are explained in detail in order to clearly explain the present invention. The embodiments are not always limited to embodiments including all the explained configurations. A part of the configuration of a certain embodiment can be replaced with the configuration of another embodiment. The configuration of another embodiment can be added to the configuration of a certain embodiment. Addition, deletion, and replacement of other configurations can be performed concerning a part of the configurations of the embodiments.

The components, the functions, the sections 110 to 117, 119 to 121, 210 to 214, 310 to 313, and 810 to 812, the storage devices 105 and 204, and the like explained above may be realized by hardware by, for example, designing a part or all of the components, the functions, and the sections with, for example, integrated circuits. As shown in FIG. 2, FIG. 22, FIG. 25, and FIG. 30, the components, the functions, and the like explained above may be realized by software by processors such as the CPUs 103, 203, 303, and 803 interpreting and executing programs for realizing the respective functions. Information such as programs, tables, and files for realizing the functions can be stored in the memories 101, 201, 301, and 801, a recording device such as a SSD (Solid State Drive), or a recording medium such as an IC (Integrated Circuit) card, an SD (Secure Digital: registered trademark) card, or a DVD (Digital Versatile Disc: registered trademark) besides being stored in a HD (Hard Disk).

In the embodiments, control lines and information lines considered to be necessary for explanation are shown. Not all of control lines and information lines are shown on a product. Actually, most of the components may be considered to be connected to one another.

REFERENCE SIGNS LIST

1, 1*a*, 1*b*, 1*d* controller
2, 2A, 2B, 2C, 2F tray carrier (conveyance device)
3 station terminal
4 WMS
6 fixed shelf
7 conveyance unit
8 attachment device (position notifying device)
11 tray (housing section)
21 main body section
22, 22*a*, 22*b* take-out device (acquiring section)
23, 23A, 23B, 23C, 23D storing section (loading section)
61 movable shelf
62 shelf carrier (shelf conveyance device)
80 forklift (non-autonomous moving device)
110, 110*a*, 110*b*, 110*d*, 210, 310, 810 processing section
111 data-reception processing section
112 order-selection processing section
113 tray retrieving section (housing-section retrieving section)
114 carrier selecting section (conveyance-device selecting section)
115 route generating section
116 transmission processing section
117 instruction processing section
119 congestion processing section (route changing section)
120 carrier-type selecting section (conveyance-device-type selecting section)
121 position managing section (prohibition-region setting section)
151 order data
152, 152*a* shelf data (storage section)
153 tray data
154 article data
155, 242 map data
211 movement control section
212 arrival notifying section
213 take-out control section
214 rotation control section
241 route data
251 vertical telescopic section
252, 252*a* arm section
253 catcher section
261 claw section
262, 603 hook
264 telescopic arm
263, 267 pole (rotating section)
271 rotating section
281A to 281C arm
291 stacking section
304 display device
305 reading device
311 display processing section
312 work monitoring section
313 notifying section
601 housing section
602 claw
604 hollow section
711 traveling prohibition region
811 position specifying section 812 position notifying section
Z, Za to Ze article conveyance system

The invention claimed is:

1. An article conveyance system comprising:
a controller including:
   a storage section having stored therein information concerning a position of a housing section stored in a shelf;
   a housing-section retrieving section that retrieves, based on the information concerning the position of the housing section, housing positions of a plurality of the housing sections, which are picking targets, in the shelf;
   a route generating section that generates a route that makes rounds of positions of the housing sections retrieved by the housing-section retrieving section; and
   a transmitting section that transmits information concerning the generated route and the housing positions of the housing sections to a conveyance device; and
the conveyance device including:
   an acquiring section that acquires the plurality of housing positions based on the housing positions of the housing sections while autonomously moving according to the information concerning the route; and
   a loading section in which the acquired plurality of housing sections are loaded,
wherein the conveyance device includes a rotating section that rotates the loading section to face a direction of an operator when the conveyance device arrives at a work station, which is a place where picking work is performed, the rotating section is arranged between the loading section and a main body section of the conveyance device, and a bottom surface of the loading section is fixed to a top surface of the rotating section, and
wherein the acquiring section, the loading section and the rotating section are integrated with each other via the main body section of the conveyance device.

2. The article conveyance system according to claim 1, wherein
information concerning sizes or weights of the housing sections is stored in the storage section, and
the route generating section generates the route such that the housing sections are stacked on the conveyance device in descending order of the sizes or the weights.

3. The article conveyance system according to claim 2, wherein the route generating section prevents height at a time when the housing sections are stacked on the conveyance device from exceeding a predetermined height.

4. The article conveyance system according to claim 1, wherein the controller includes a conveyance-device selecting section that selects the conveyance device that is not performing conveyance work among a present plurality of the conveyance devices.

5. The article conveyance system according to claim 1, wherein the controller includes a route changing section that changes a route of the conveyance device when a time until the conveyance device acquires next one of the housing sections is equal to or longer than a predetermined time.

6. The article conveyance system according to claim 5, wherein the route changing section causes the conveyance device to travel to a work station, which is a place where picking work is performed, even if not all of the housing sections scheduled to be acquired are acquired.

7. The article conveyance system according to claim 1, further comprising:
a route changing section that changes the route of the conveyance device when conveyance devices notify one another of positions of the conveyance devices and a predetermined number or more conveyance devices are present in a predetermined range.

8. The article conveyance system according to claim 1, further comprising a shelf conveyance device that conveys a movable shelf, which is a shelf movably set.

9. The article conveyance system according to claim 8, wherein
information concerning whether a shelf is a fixed shelf, which is a shelf fixedly set, or the movable shelf is stored in the storage section, and
the controller includes a conveyance-device-type selecting section that selects, when the shelf set as the picking target is the fixed shelf, the conveyance device as a carrier that conveys the fixed shelf and selects, when the shelf set as the picking target is the movable shelf, the shelf conveyance device as a carrier that conveys the movable shelf.

10. The article conveyance system according to claim 8, wherein a space capable of housing the movable shelf is provided in a lower part of a fixed shelf, which is a shelf fixedly set.

11. The article conveyance system according to claim 1, wherein the controller includes a prohibition-region setting section that acquires a position of a non-autonomous moving device operated by a person and sets a predetermined range from the position of the non-autonomous moving device as a traveling prohibition region.

12. The article conveyance system according to claim 11, wherein
the non-autonomous moving device includes a detachable position notifying device, and
the detachable position notifying device transmits the position of the non-autonomous moving device to the controller.

13. A conveyance device comprising:
a receiving section that receives, from a controller that has stored therein information concerning a position of a housing section stored in a shelf, retrieves, based on the information concerning the position of the housing section, housing positions of a plurality of the housing sections, which are set as picking targets, in the shelf, generates a route that makes rounds of the retrieved positions of the housing sections, and transmits information concerning the generated route and the housing positions of the housing sections to a conveyance device, the information concerning the route;
an acquiring section that acquires the plurality of housing sections based on the housing positions of the housing sections while autonomously moving according to the information concerning the route;
a loading section in which the acquired plurality of housing sections are loaded; and
a rotating section that rotates the loading section to face a direction of an operator when the conveyance device arrives at a work station, which is a place where picking work is performed, the rotating section is arranged between the loading section and a main body section of the conveyance device, and a bottom surface of the loading section is fixed to a top surface of the rotating section, wherein the acquiring section, the loading section and the rotating section are integrated with each other via the main body section of the conveyance device.

14. An article conveyance system comprising:
a controller including:
 a storage section having stored therein information concerning a position of a housing section stored in a shelf;
 a housing-section retrieving section that retrieves, based on the information concerning the position of the housing section, housing positions of a plurality of the housing sections, which are picking targets, in the shelf;
 a route generating section that generates a route that makes rounds of positions of the housing sections retrieved by the housing-section retrieving section; and
 a transmitting section that transmits information concerning the generated route and the housing positions of the housing sections to a conveyance device; and
the conveyance device including:
 an acquiring section that acquires the plurality of housing sections based on the housing positions of the housing sections while autonomously moving according to the information concerning the route; and
 a loading section in which the acquired plurality of housing sections are loaded,
wherein the conveyance device includes a rotating section that rotates the loading section to face a direction of an operator when the conveyance device arrives at a work station, which is a place where picking work is performed, the rotating section is arranged between the loading section and a main body section of the conveyance device, and a bottom surface of the loading section is fixed to a top surface of the rotating section, and
wherein the controller is configured to control the acquiring section to avoid a collision between the acquiring section and the loading section during rotation of the loading section.

15. An conveyance device comprising:
a receiving section that receives, from a controller that has stored therein information concerning a position of a housing section stored in a shelf, retrieves, based on the information concerning the position of the housing section, housing positions of a plurality of the housing sections, which are set as picking targets, in the shelf, generates a route that makes rounds of the retrieved positions of the housing sections, and transmits information concerning the generated route and the housing positions of the housing sections to a conveyance device, the information concerning the route;
an acquiring section that acquires the plurality of housing sections based on the housing positions of the housing sections while autonomously moving according to the information concerning the route;
a loading section in which the acquired plurality of housing sections are loaded; and
a rotating section that rotates the loading section to face a direction of an operator when the conveyance device arrives at a work station, which is a place where picking work is performed, the rotating section is arranged between the loading section and a main body section of the conveyance device, and a bottom surface of the loading section is fixed to a top surface of the rotating section,
wherein the controller is configured to control the acquiring section to avoid a collision between the acquiring section and the loading section during rotation of the loading section.

* * * * *